United States Patent
Hiller et al.

(10) Patent No.: US 11,197,404 B2
(45) Date of Patent: Dec. 14, 2021

(54) SAND BUNKER RAKE AND INFIELD GROOMER APPARATUS

(71) Applicant: MTD Products Inc, Valley City, OH (US)

(72) Inventors: Adam Hiller, Jeromesville, OH (US); Peter J. Buchanan, Elyria, OH (US)

(73) Assignee: MTD Products, Inc, Valley City, OH (US)

( * ) Notice: Subject to any disclaimer, the term of this patent is extended or adjusted under 35 U.S.C. 154(b) by 401 days.

(21) Appl. No.: 16/248,920

(22) Filed: Jan. 16, 2019

(65) Prior Publication Data

US 2019/0216000 A1 Jul. 18, 2019

Related U.S. Application Data

(60) Provisional application No. 62/618,050, filed on Jan. 16, 2018, provisional application No. 62/618,852, filed on Jan. 18, 2018.

(51) Int. Cl.
| | |
|---|---|
| *A63B 57/50* | (2015.01) |
| *A01B 59/042* | (2006.01) |
| *A01B 45/00* | (2006.01) |
| *A01B 51/02* | (2006.01) |
| *A01B 35/14* | (2006.01) |
| *A01B 19/02* | (2006.01) |
| *A01B 35/32* | (2006.01) |
| *A01B 59/06* | (2006.01) |

(Continued)

(52) U.S. Cl.
CPC .......... *A01B 59/042* (2013.01); *A01B 19/02* (2013.01); *A01B 35/14* (2013.01); *A01B 35/32* (2013.01); *A01B 45/00* (2013.01); *A01B 51/02* (2013.01); *A01B 59/06* (2013.01); *A01B 61/046* (2013.01); *A01B 63/02* (2013.01); *A01G 20/40* (2018.02);

(Continued)

(58) Field of Classification Search
CPC ... A01D 34/001; A01D 78/148; E02F 3/7627; E02F 3/7604; E02F 3/7609; E02F 3/96; E01H 1/105; E01H 5/061; A01G 20/40; A01G 20/43; A01B 35/04; A01B 35/06; A01B 35/14; A01B 35/10; A01B 35/12; A01B 35/32; A01B 45/00; A01B 51/02;
(Continued)

(56) References Cited

U.S. PATENT DOCUMENTS 3,613,802 A * 10/1971 Carlson .................. A01D 76/00
172/457
4,148,174 A * 4/1979 Mathews ............... A01D 75/30
56/12.7

(Continued)

FOREIGN PATENT DOCUMENTS

DE 20303383 U1 4/2003

OTHER PUBLICATIONS

International Search Report and Written Opinion issued in related International Application No. PCT/US2019/013744, dated Apr. 10, 2019, 13 pages.

*Primary Examiner* — Adam J Behrens
(74) *Attorney, Agent, or Firm* — Wegman Hessler

(57) ABSTRACT

A sand bunker rake/infield groomer vehicle having a frame; a plurality of wheels to traverse a driven surface, wherein the wheels are rotatably mounted to the frame; a power source mounted to the frame; and a rear attachment structure attached to the frame, wherein the rear attachment structure provides a joint enabling rotation; a bracket including a shaft wherein the bracket is configured to cooperate with an associated rake/grooming attachment; and a pivoting bracket mounted to the frame.

8 Claims, 26 Drawing Sheets

(51) Int. Cl.
*A01B 63/02* (2006.01)
*E02F 3/76* (2006.01)
*E02F 3/96* (2006.01)
*A01B 61/04* (2006.01)
*E01H 1/10* (2006.01)
*E01H 5/06* (2006.01)
*A01G 20/40* (2018.01)
*E01C 19/20* (2006.01)

(52) U.S. Cl.
CPC ............ *A63B 57/50* (2015.10); *E01H 1/105* (2013.01); *E01H 5/061* (2013.01); *E02F 3/7604* (2013.01); *E02F 3/7609* (2013.01); *E02F 3/96* (2013.01); *E01C 19/20* (2013.01)

(58) Field of Classification Search
CPC ..... A01B 59/06; A01B 59/042; A01B 61/046; A01B 63/02; A01B 19/02; A63B 57/50
See application file for complete search history.

(56) References Cited

U.S. PATENT DOCUMENTS

| | | | | |
|---|---|---|---|---|
| 4,217,962 A | * | 8/1980 | Schaefer | E02F 3/64 172/197 |
| 4,531,757 A | * | 7/1985 | Kuhn | B60D 1/141 172/448 |
| 5,427,185 A | * | 6/1995 | Seal | E02F 3/7627 172/197 |
| 5,427,399 A | * | 6/1995 | Olson | A01B 59/042 280/508 |
| 6,450,268 B1 | * | 9/2002 | Taylor | A01B 1/24 111/130 |
| 7,065,947 B1 | * | 6/2006 | Street | A01B 45/00 172/29 |
| 7,464,528 B1 | * | 12/2008 | Street | A01B 45/00 56/371 |
| D802,026 S | * | 11/2017 | Schmidt | D15/15 |
| 10,046,214 B2 | * | 8/2018 | Schmidt | A63B 57/50 |
| 10,765,053 B1 | * | 9/2020 | Keigley | A01B 31/00 |
| 2007/0095549 A1 | | 5/2007 | Modzik | |
| 2011/0079968 A1 | | 4/2011 | Murphy et al. | |
| 2013/0062082 A1 | * | 3/2013 | Layton | A01B 31/00 172/445.1 |
| 2014/0262387 A1 | * | 9/2014 | Schmidt | A63B 57/50 172/663 |
| 2015/0201554 A1 | * | 7/2015 | McCarthy | A01D 43/00 56/14.7 |
| 2016/0114640 A1 | * | 4/2016 | Huegerich | B60D 1/36 280/421 |
| 2018/0297428 A1 | * | 10/2018 | Tozer | B60D 1/025 |

* cited by examiner

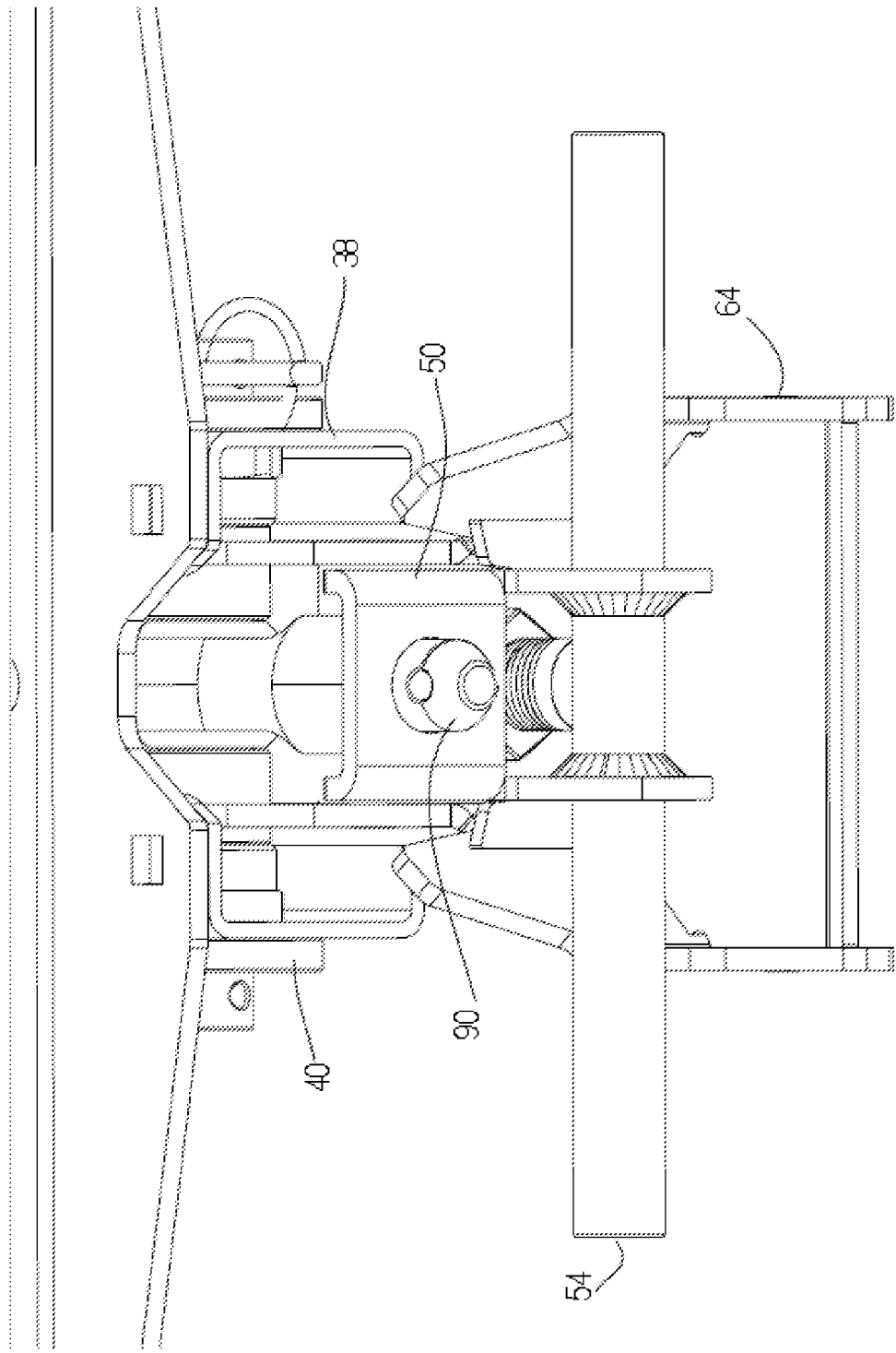

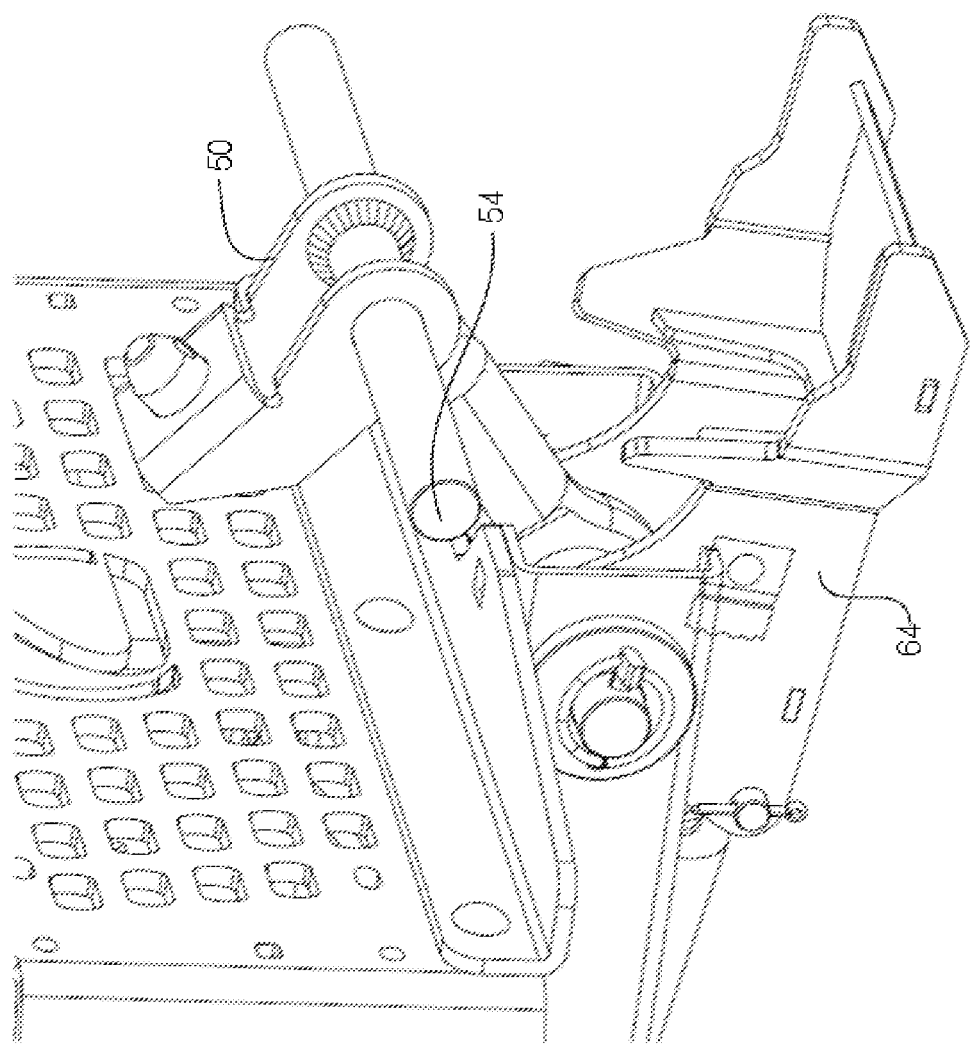

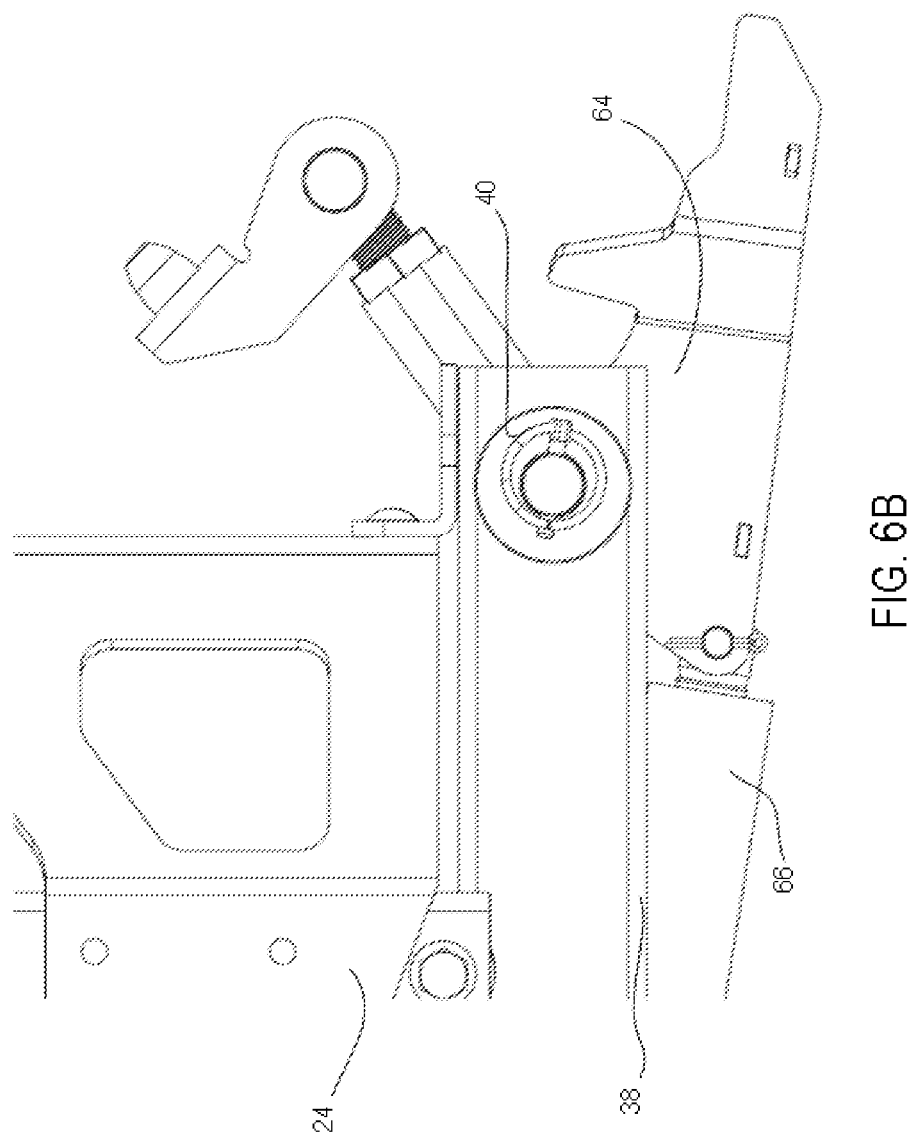

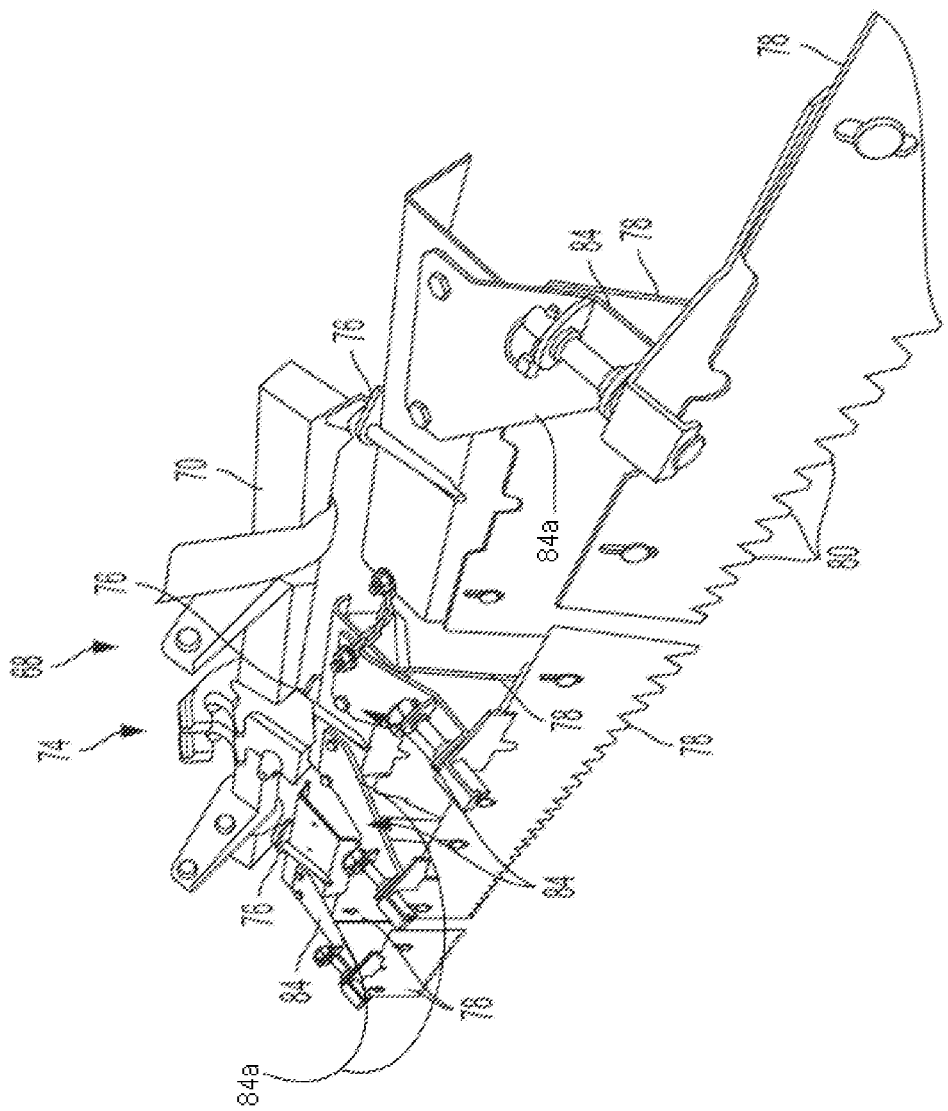

SAND BUNKER RAKE AND INFIELD GROOMER APPARATUS

CROSS REFERENCE TO RELATED APPLICATIONS

This application claims priority to U.S. Provisional Appl. Ser. No. 62/618,050, filed Jan. 16, 2018, and to U.S. Provisional Appl. Ser. No. 62/618,852, filed Jan. 18, 2018, the entireties of which are incorporated herein by reference.

BACKGROUND

1. Field of the Disclosure

The present disclosure is directed to a sand bunker rake and infield groomer and more particularly, mounting devices attached to the sand bunker rake and infield groomer.

2. Description of Related Art

Some known sand bunker rakes and infield groomers include mounting schemes that limit the functionality of the grooming/raking devices attached to the sand bunker rake/ infield groomer. This can cause unnecessary time to drive the grooming/raking device over the same area more than once. Some mounting schemes provide little to no limitation to the angle of a rake/groomer attachment at the rear of the vehicle. Presently known mounting schemes can also unnecessarily increase the effort and/or time needed to adjust a plow angle on the forward end of a sand bunker rake/infield groomer.

Accordingly, there is a need for improved attachment devices for sand bunker rakes and infield groomers.

SUMMARY

Advantages of the present disclosure will become more apparent to those skilled in the art from the following description of the embodiments of the disclosure which have been shown and described by way of illustration. As will be realized, the described apparatus and method are capable of other and different embodiments, and their details are capable of modification in various respects.

In one aspect of the present technology, a sand bunker rake/infield groomer vehicle is provided. The sand bunker rake/infield groomer comprises a frame; a plurality of wheels to traverse a driven surface, wherein the wheels are rotatably mounted to the frame; a power source mounted to the frame; and a rear attachment structure attached to the frame, wherein the rear attachment structure comprises: a joint enabling rotation; a bracket including a shaft wherein the bracket is configured to cooperate with an associated rake/grooming attachment; and a pivoting bracket mounted to the frame.

In some embodiments, the joint enabling rotation is a ball joint. In some embodiments, the ball joint is configured to enable motion of the associated rake/grooming attachment. In some embodiments, the bracket defines an aperture, wherein the shaft and aperture are configured to cooperate with a clevis and a pin on an associated rake/grooming attachment. In some embodiments, the aperture of the bracket does not typically experience force loading from the pin of the associated rake/grooming attachment. In some embodiments, the bracket comprises a pin, wherein the shaft and the pin are configured to cooperate with a clevis and an aperture on an associated rake/grooming attachment.

In some embodiments, the sand bunker rake/infield groomer vehicle further comprises a lift mechanism, wherein the lift mechanism is configured to control a height of the associated rake/grooming attachment from the driven surface.

In some embodiments, the sand bunker rake/infield groomer vehicle further comprises a mid-mount attachment structure attached to the frame, wherein the mid-mount attachment structure comprises: a pair of arms, each arm having a concave opening configured to cooperate with a beam of an associated scarifier attachment, at least one arm includes a pin configured to help secure the associated scarifier attachment to the pair of arms. In some embodiments, the sand bunker rake/infield groomer vehicle further comprises a rear axle attached to the frame and wherein the pair of arms are configured to rotate about the rear axle.

In some embodiments, the sand bunker rake/infield groomer vehicle further comprises a trip mechanism configured to enable a portion of the associated scarifier attachment to rotate upon encountering an object or obstacle that creates a sufficient force to activate the trip mechanism.

In yet another aspect of the present technology, a sand bunker rake/infield groomer vehicle is provided. The sand bunker rake/infield groomer vehicle comprises a frame; a plurality of wheels to traverse a driven surface, wherein the wheels are rotatably mounted to the frame; a power source mounted to the frame; and a front attachment structure attached to the frame, wherein the front attachment structure comprises: a pusher device, said pusher device configured to rotate to adjust an angle of attack relative to the driven surface.

In some embodiments, the front attachment structure further comprises: a pusher axis of rotation that is substantially horizontal, a rack device including several openings, and a handle attached to the pusher that can be moved to any of the several openings to rotate the pusher, thereby adjusting the angle of attack. In some embodiments, the sand bunker rake/infield groomer vehicle further comprises a lifting mechanism configured to adjust the height of the pusher relative to the driven surface.

In yet another aspect of the present technology, a sand bunker rake/infield groomer vehicle is provided. The sand bunker rake/infield groomer vehicle comprises a frame; a plurality of wheels to traverse a driven surface, wherein the wheels are rotatably mounted to the frame; a power source mounted to the frame; a zero-turn steering control system; and a rear attachment structure attached to the frame, wherein the rear attachment structure comprises: a joint enabling rotation; a bracket including a shaft and a pin, wherein the shaft and pin are configured to cooperate with a clevis and an aperture on an associated rake/grooming attachment; and a pivoting bracket mounted to the frame.

BRIEF DESCRIPTION OF THE DRAWINGS

These and other features of the present disclosure, and their advantages, are illustrated specifically in embodiments of the disclosure now to be described, by way of example, with reference to the accompanying diagrammatic drawings, in which:

FIGS. 4A-4B depict a rear elevation view of embodiments of the rear attachment structure of FIGS. 3A-3B;

FIGS. 5A-5B are similar to FIGS. 3A-3B showing a bracket in an elevated position;

FIGS. 6A-6B depict a side view of embodiments of a lifting mechanism and a pivoting bracket mounted to the underside of the rake/groomer of FIG. 1;

FIGS. 7A-7B depict a detail view of embodiments of an associated rear rake/grooming attachment configured to be attached to the rake/groomer of FIG. 1;

Figure 1:
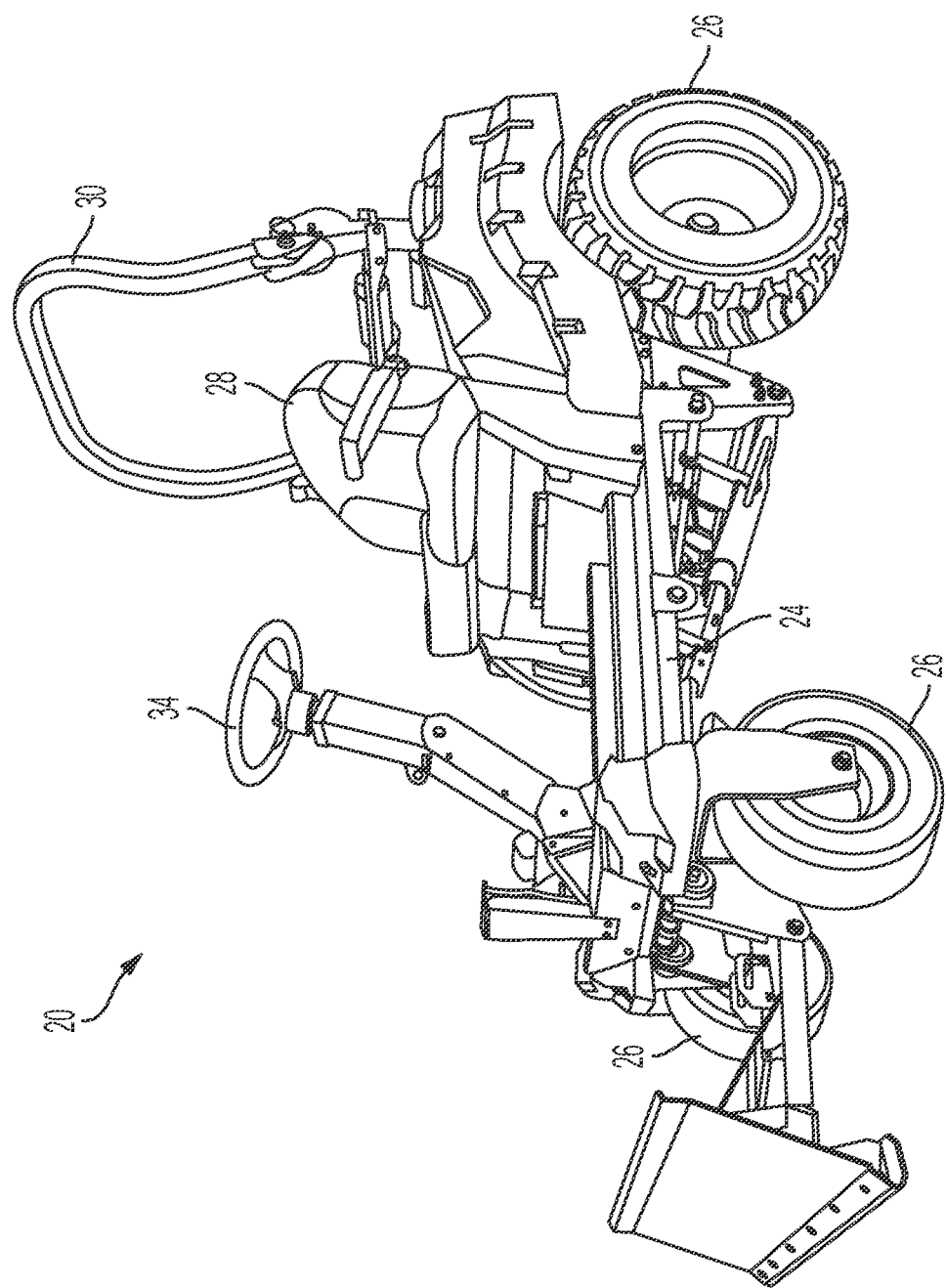
FIG. 1 is a side view of an embodiment of a sand bunker rake/infield groomer of the present disclosure.

It should be noted that all the drawings are diagrammatic and not drawn to scale. Relative dimensions and proportions of parts of these figures may have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

Turning to FIG. 1, an embodiment of sand bunker rake/infield groomer vehicle 20 is shown. The sand bunker rake/infield groomer 20 includes a frame 24. The frame 24 serves as a platform to mount the remainder of the components of the sand bunker rake/infield groomer 20. The frame 24 can be constructed of any suitable material designed to withstand the typical operating requirements of such a vehicle. The sand bunker rake/infield groomer 20 also includes a plurality of wheels 26. Typical of many wheel assemblies, the wheels 26 are rotatably mounted to the frame 24 to enable the sand bunker rake/infield groomer 20 to be pushed or propelled along a driven surface with a rotating wheel, thus minimizing friction with the driven surface, such as a golf course sand bunker or a playing surface infield. Other driven surfaces are also contemplated.

While not shown, the sand bunker rake/infield groomer 20 includes a power source mounted to the frame 24. The power source can be used to propel the sand bunker rake/infield groomer 20 in forward and reverse directions, power various attachments, etc. Among other devices, the sand bunker rake/infield groomer 20 can further include a seat 28 for an operator, a roll bar 30, steering system having a steering wheel 34, and other devices enabling efficient operation of outdoor power equipment.

Figure 2A:
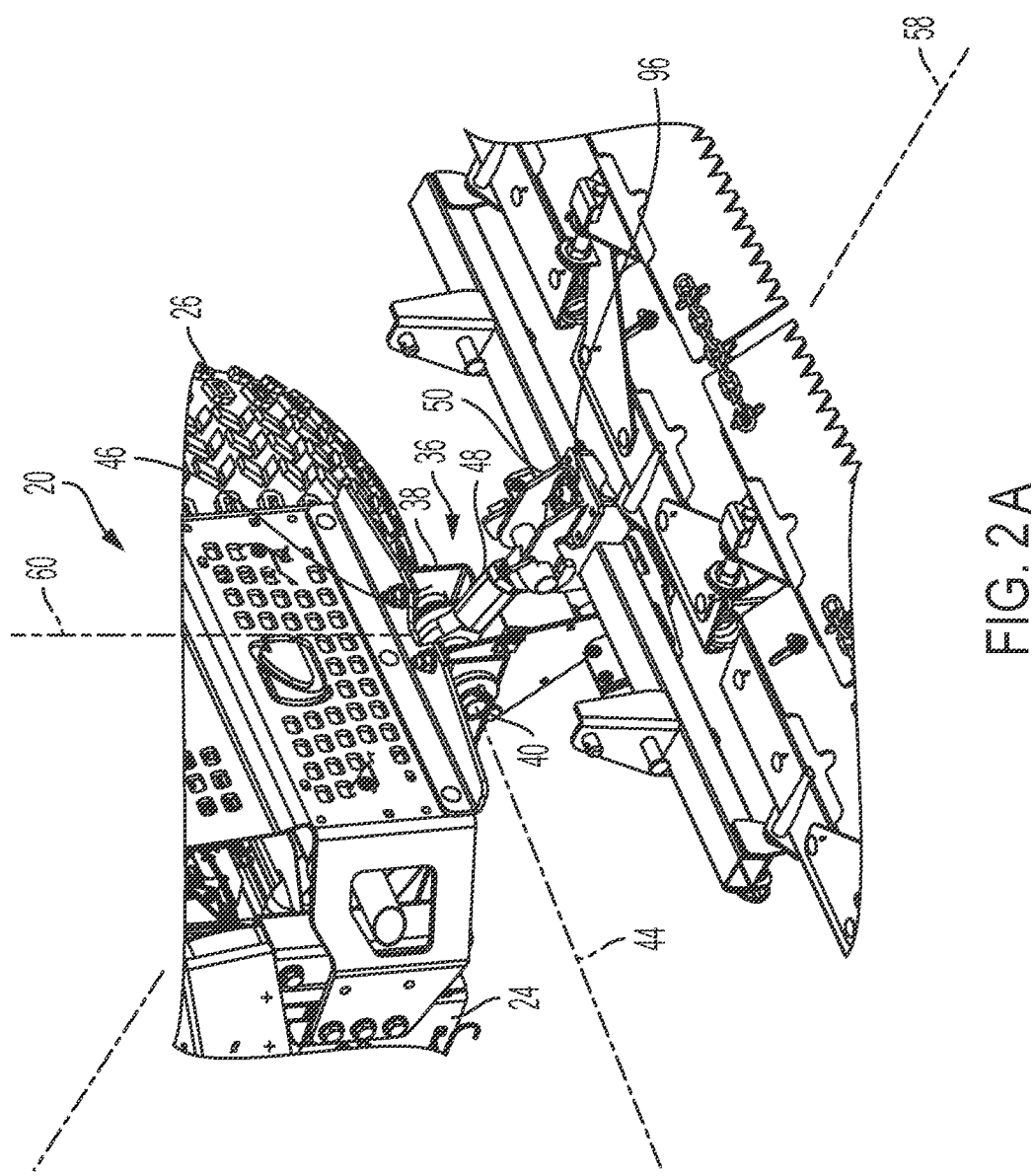
FIGS. 2A-2B depict a detail perspective view of embodiments of a rear portion of the sand bunker rake/infield groomer of FIG. 1, showing a rear attachment structure.
Figure 2B:
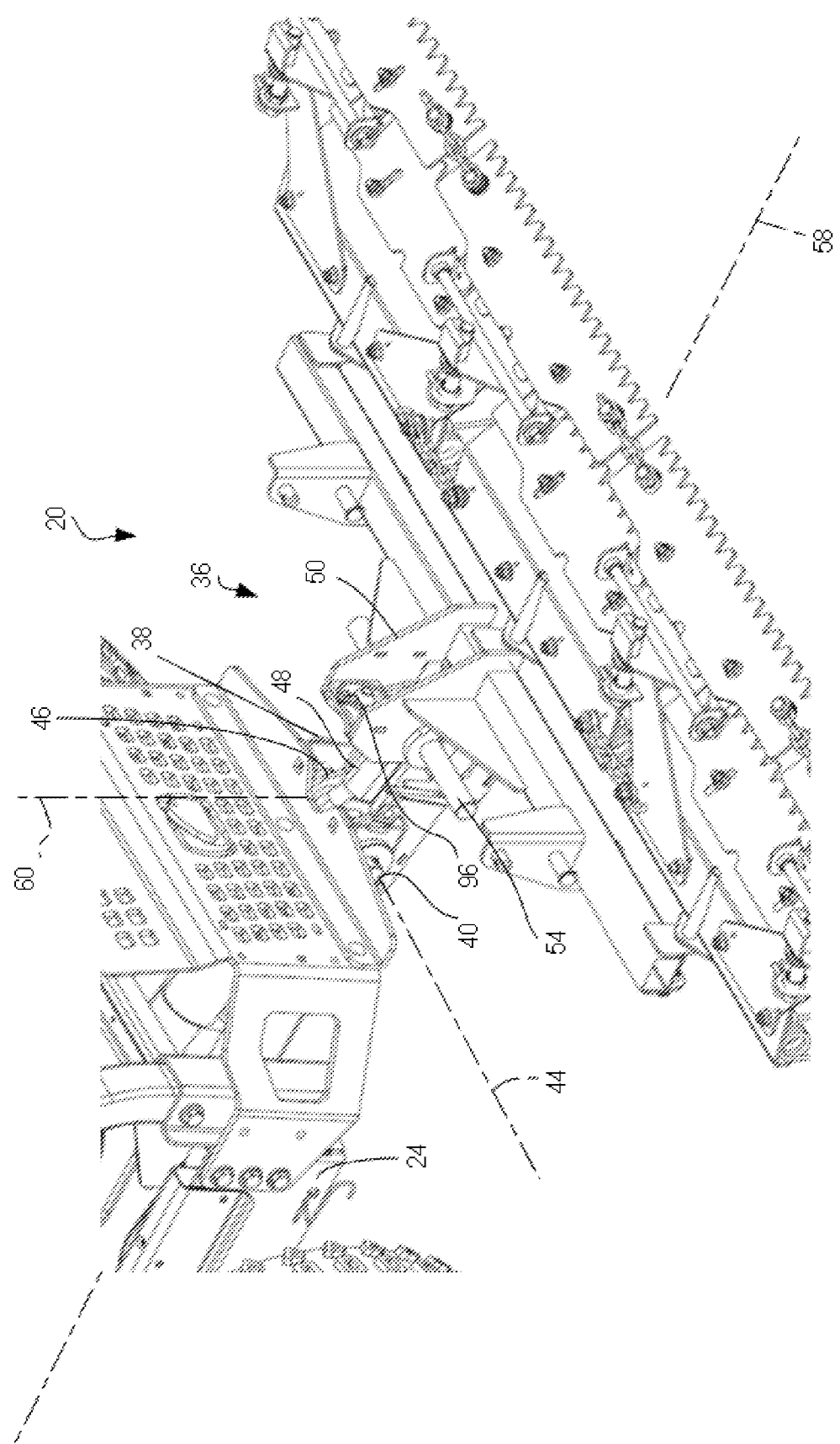

Turning to FIGS. 2A-2B, the sand bunker rake/infield groomer 20 comprises a rear attachment structure 36 attached to the frame 24. The rear attachment structure 36 includes a box beam 38 that can be constructed of one unitary structure, or several U-shaped beams. The box beam 38 defines an aperture that enables a pin 40 to pass at least partially through the box beam 38. The aperture and pin 40 are centered about an axis referred to as 44 in FIGS. 2A-2B. The rear attachment structure 36 further includes a joint 46 enabling rotation. In one example, the joint 46 is a ball joint. The joint 46 can include a short shaft 48 that is threadingly engaged with a bracket 50. Details of these structures can perhaps be best seen in FIGS. 3-5.

Figure 3A:
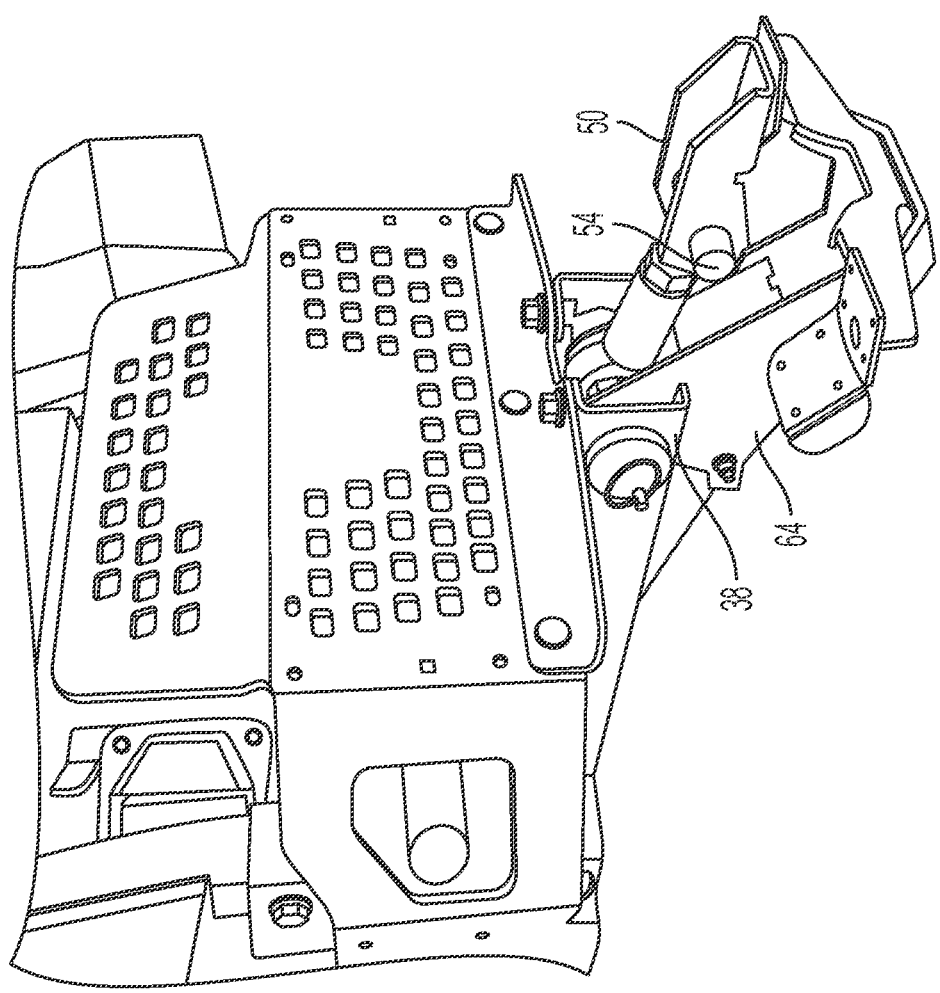
FIGS. 3A-3B depict a perspective detail view of embodiments of the rear attachment structure, similar to FIGS. 2A-2B.
Figure 3B:
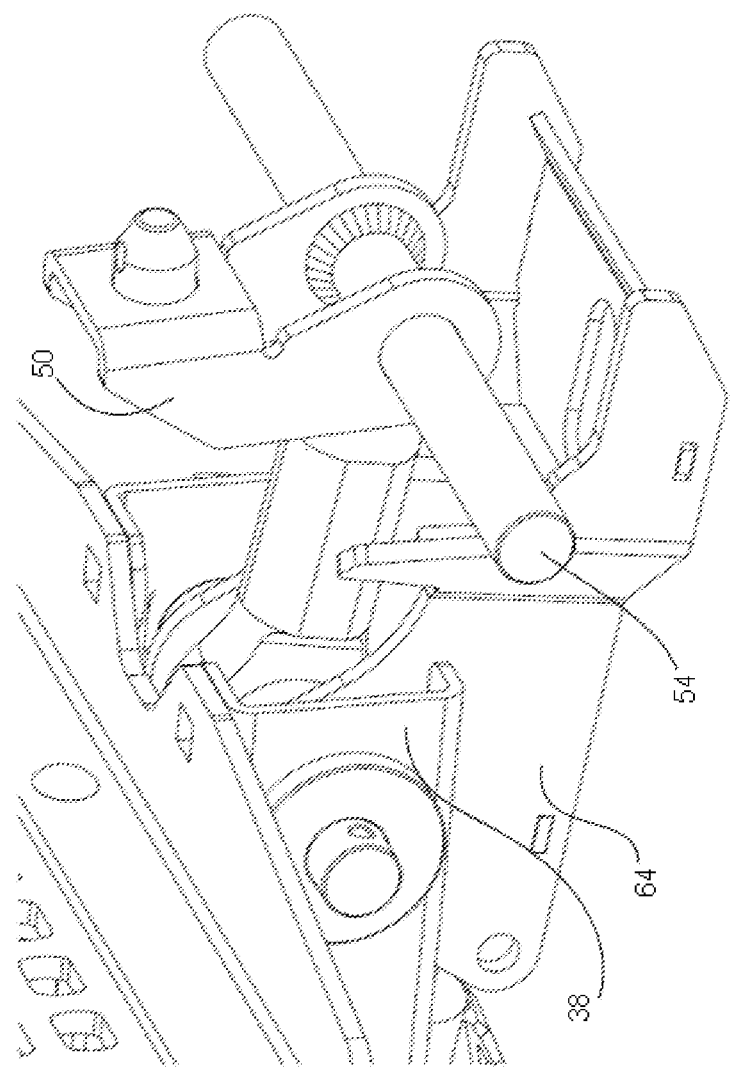

The joint 46 enables movement of the short shaft 48 and the bracket 50 about three axes, 44, 58, and 60. This flexibility in movement enables the associated rake/grooming attachment to have relatively large amounts of freedom of movement to account for varying surface conditions, vehicle turning operations, etc. FIGS. 2-4 show the joint 46 rotated to a lower limit, thus placing the bracket 50 at a relatively low elevation. FIGS. 5A-5B depict the joint 46 rotated to a high limit, thus placing the bracket 50 at a relatively high elevation. While only the elevation rotation of joint 46 is shown, it is to be appreciated that the joint 46 can rotate some number of degrees about axes 58 and 60. In one example, the joint 46 can rotate about 17 degrees about generally vertical axis 60 as measured from the longitudinal axis 58 to the furthest swing point outward. This can include about 34 total degrees of rotation about the axis 60.

The rear attachment structure 36 also includes a pivoting bracket 64 mounted to the frame 24. The pivoting bracket 64 is configured to rotate about the axis 44, which is the same axis on which joint 46 is mounted.

Figure 4A:
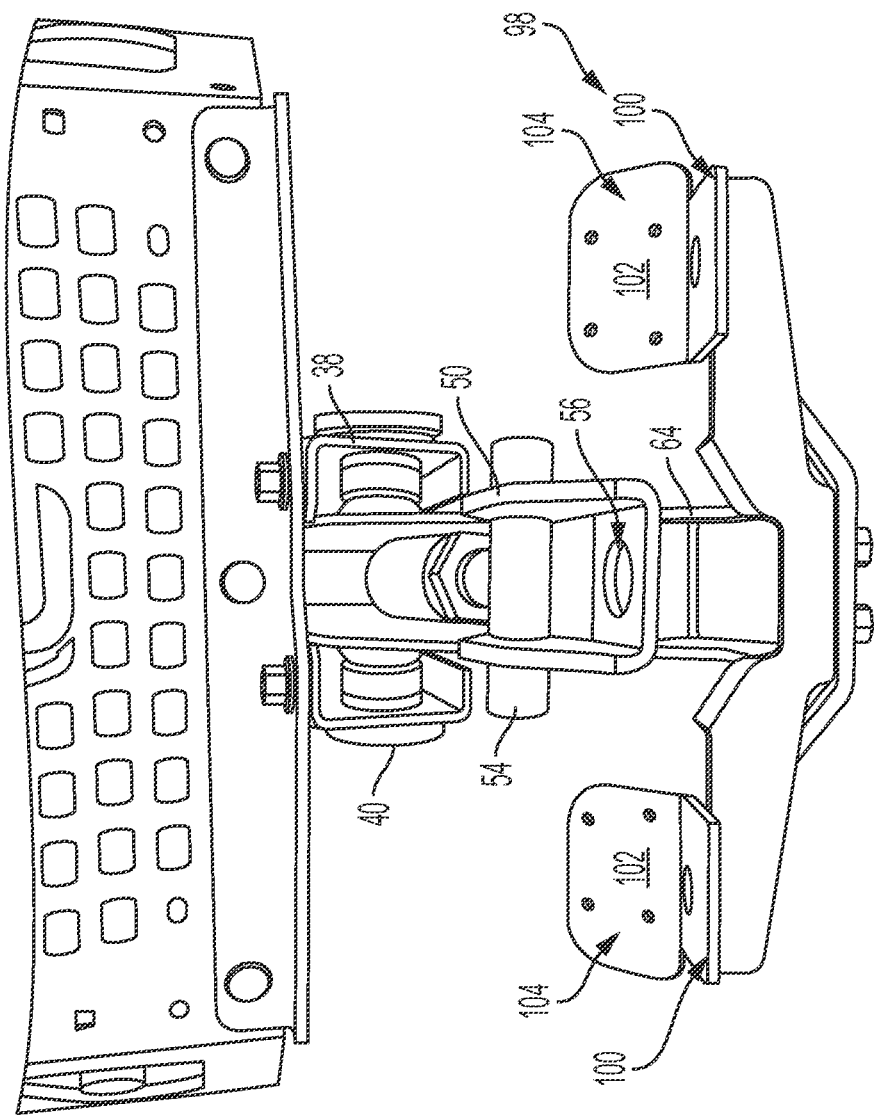
Figure 5A:
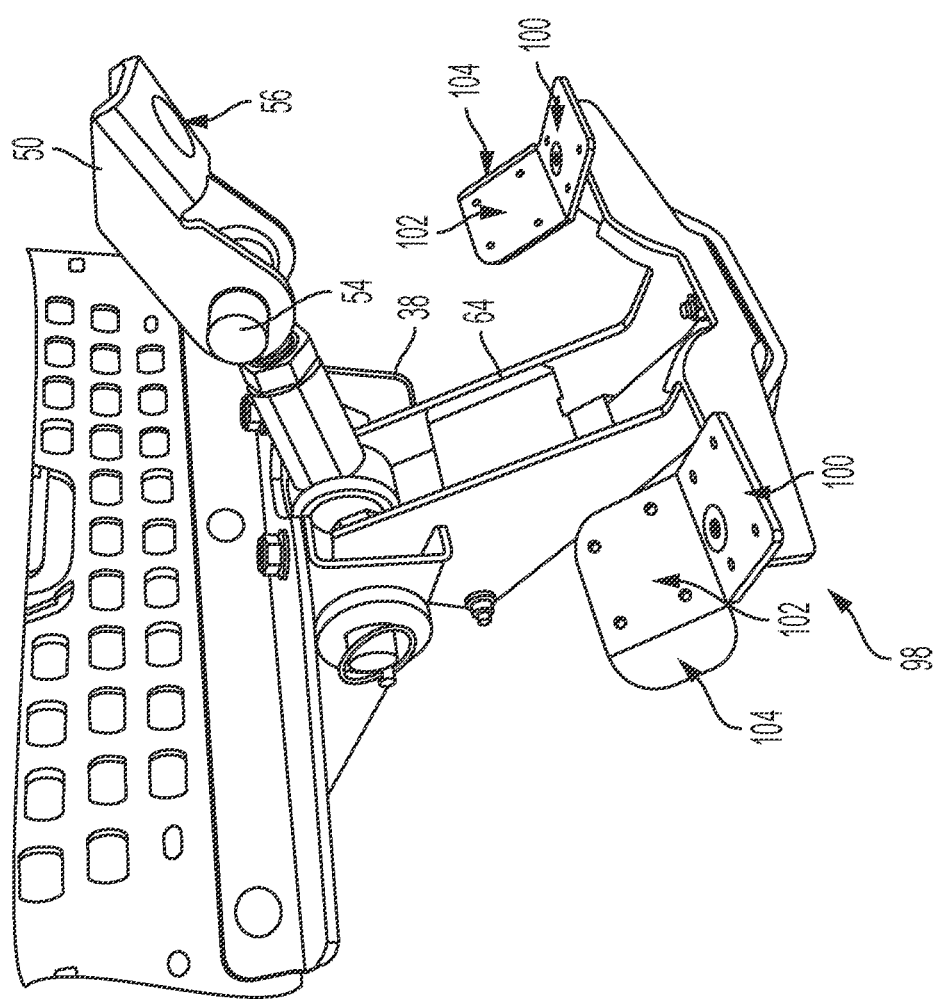

Referring to FIGS. 4A-4B, embodiments of the bracket 50 is provided. In one embodiment, as shown in FIG. 4A, the bracket 50 comprises a shaft 54 and defines an aperture 56. In such embodiments, the shaft 54 and the aperture 56 are configured to cooperate with an associated rake/grooming attachment that will be described below. In other embodiments, as shown in FIG. 4B, the bracket 50 comprises a shaft 54 and a pin 90. In such embodiments, the shaft 54 and pin 90 are configured to cooperate with an associated rake/grooming attachment that will be described below. It should be understood that the aperture 56 can be circular, oblong, or of any other suitable shape desired to receive the pin 90.

Figure 6A:
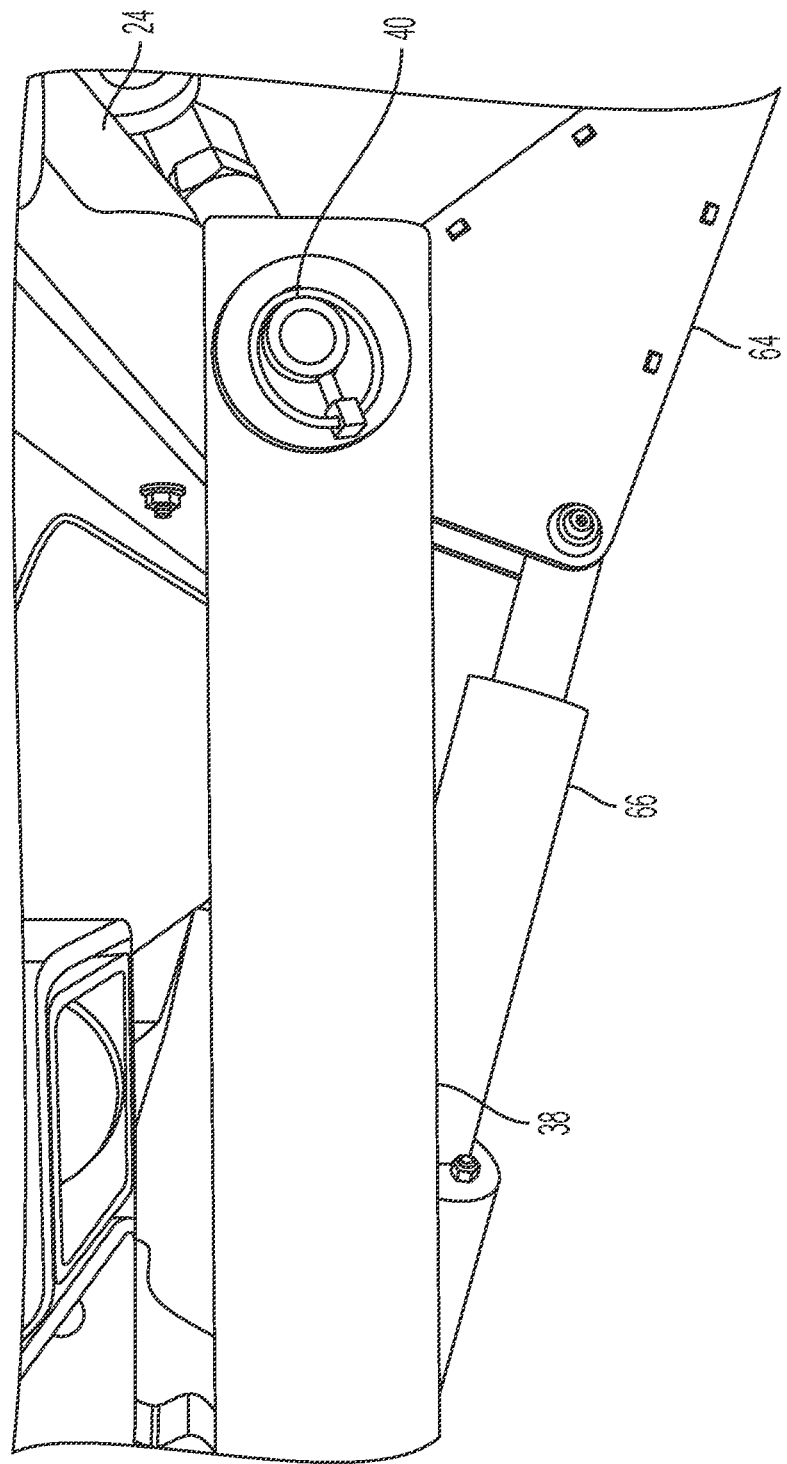

Turning to FIGS. 6A-6B, the attachment structure 36 can further include a lift mechanism 66. The lift mechanism 66 is configured to control a height of the associated rake/grooming attachment from the driven surface. In the shown example, the lift mechanism is a cylinder that can be extended and retracted to move the attachment to a desired height from the driven surface. It should be understood by a person skilled in the art that any suitable mechanism or actuator can be used with the present disclosure.

Figure 7B:
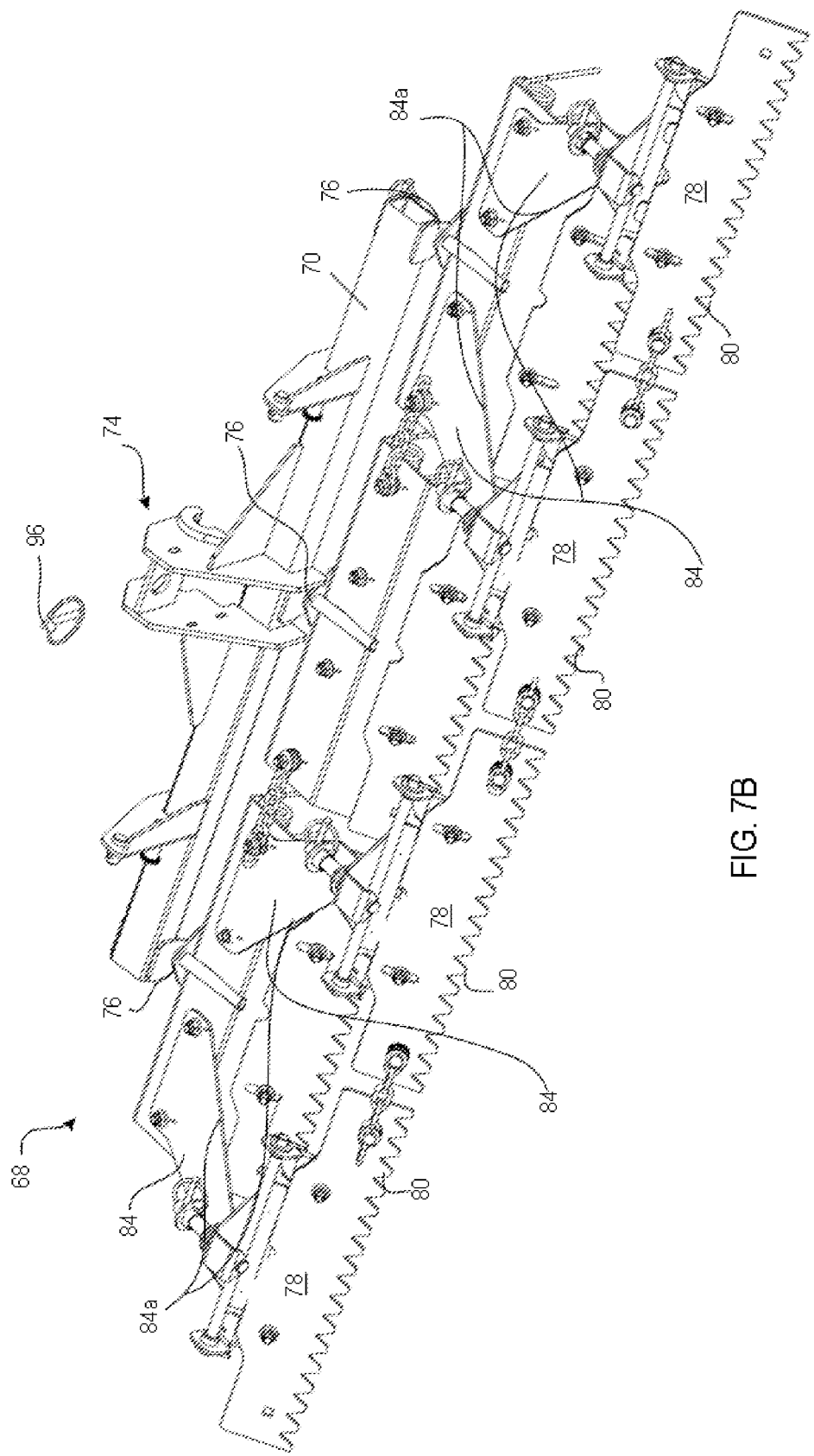

Now turning to FIGS. 7A-7B, an associated rake/grooming attachment 68 is shown. The attachment 68 can include a generally horizontal beam 70 passing through a central mounting location 74 that will be described below. The horizontal beam 70 includes at least one mounting location 76 for comb structures 78. Three mounting locations 76 are shown in FIGS. 7A-7B, however, any suitable number of mounting locations are acceptable. The mounting locations 76 can each permit rotation about a generally horizontal axis. As such, each of the comb structures 78 can rotate to conform to various driven surface conditions. Each comb structure 78 can include teeth or tines 80 that are configured to dress or groom a surface such as a sand trap or a playing surface infield, warning track, etc.

As shown in FIGS. 7A-7B, the comb structures 78 can be staggered to promote a more regulated pattern of grooming to the driven surface, be it sand, dirt, etc. In some embodiments, as shown in FIGS. 7A-7B, there are three comb structures 78 that are closer to the sand bunker rake/infield groomer vehicle. These comb structures 78 include brackets 84 that are used to mount a second row of four comb structures 78. As shown, the brackets 84 are generally shaped such that they include a tapered edge 84a. It should be understood that the brackets 84 can be of any shape appropriate to achieve the functionality described in the present disclosure.

In some embodiments, as shown in FIG. 7A, the attachment 68 includes four brackets 84, wherein the brackets 84 are positioned such that the tapered edge 84a is facing toward the central mounting location 74. In other embodiments, as shown in FIG. 7B, the brackets are positioned such that the innermost brackets 84 are positioned such that the tapered edge 84a is facing away from the central mounting portion 74, and the outermost brackets 84 are positioned such that the tapered edge 84a is facing toward the central mounting location 74. It is believed that the bracket configuration as shown in FIG. 7B provides for improved weight distribution of the comb structures 78.

Any number or combination of rows and comb structures can be used in the present disclosure. As with the mounting locations 76, the brackets 84 can also enable rotation of the comb structures 78 attached in the row of four as shown. To help ensure a more uniform dressing or grooming of the driven surface, adjacent comb structures 78 can be connected via chain 86 such that any one comb structure 78 has some limit of rotation compared to its adjacent comb structure 78. While not shown, the attachment 68 can also include optional broom or raking attachments that can trail the comb structures 78 during forward motion of the vehicle 20.

Figure 8A:
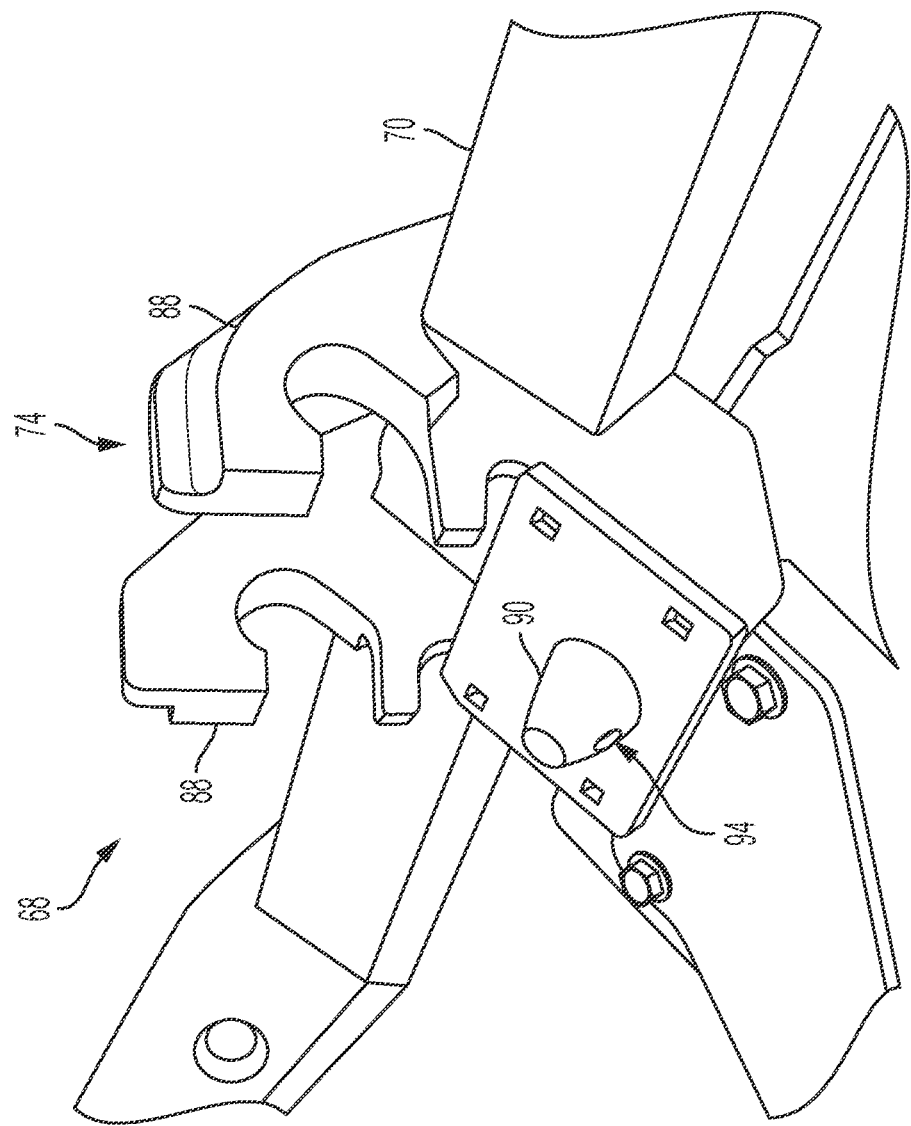
FIGS. 8A-8B depict a detail view of an exemplary embodiment of an arrangement of the attachment of FIGS. 7A-7B.
Figure 8B:
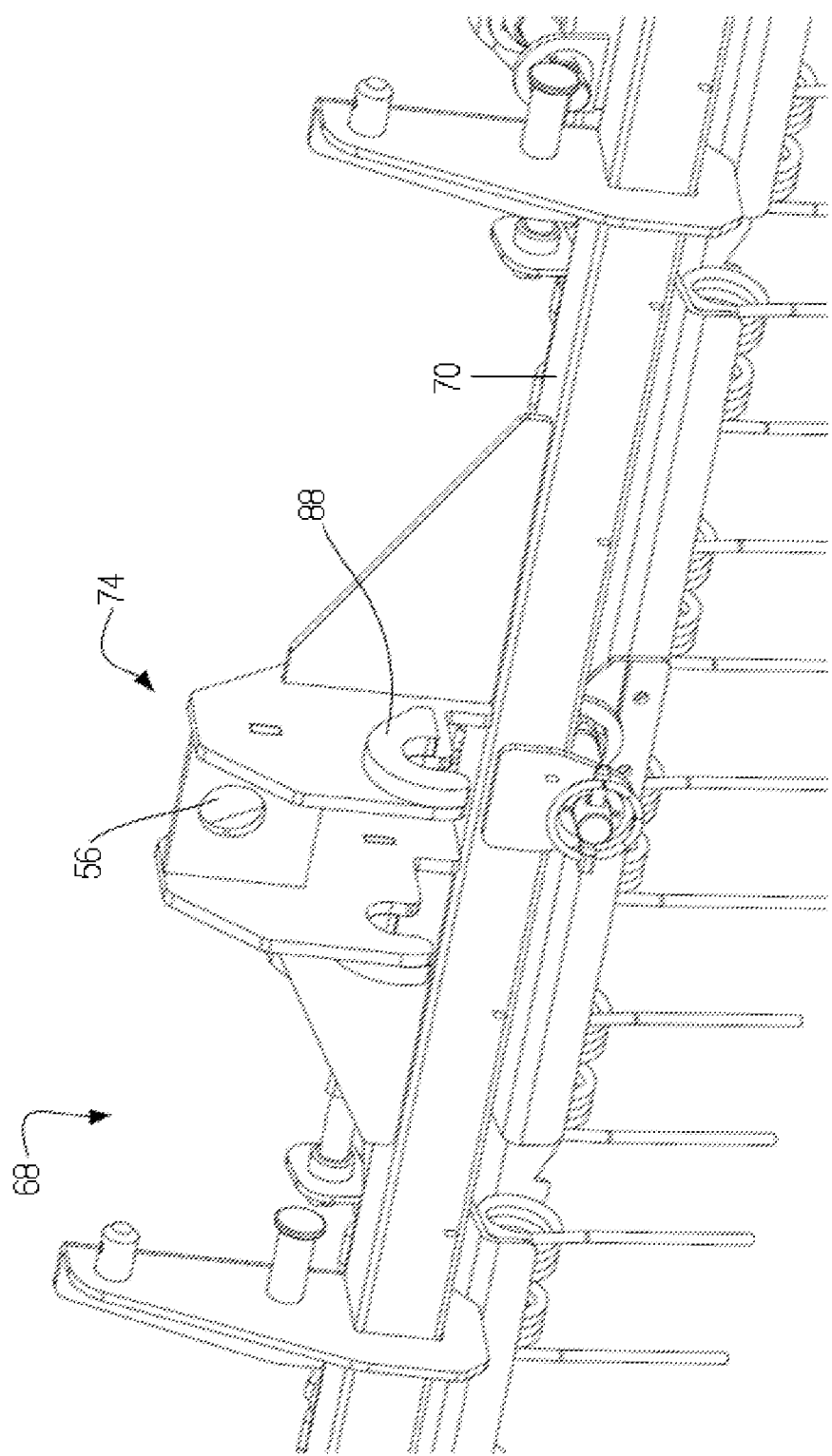

Turning to FIGS. 8A-8B, the central mounting structure 74 is shown in detail. In FIG. 8A, in one embodiment, the central mounting structure 74 includes a clevis 88 and a pin 90. The previously described shaft 54 and aperture 56 of the bracket 50 (as shown in FIG. 4A) are configured to cooperate with the clevis 88 and the pin 90 on the associated rake/grooming attachment 68. As shown best in FIG. 2A, the clevis 88 surrounds a portion of the shaft 54, and the pin 90 passes through the aperture 56. The pin 90 can also define an aperture 94 suitable for a linchpin 96 (best seen in FIG. 2A) to pass through to secure the attachment 68 to the bracket 50, and therefore, the rear attachment structure 36. In this way, the vehicle 20 can pull the attachment 68 behind the vehicle 20. In such an embodiment, the aperture 56 does not typically experience force loading from the pin 90.

In an alternate embodiment, as in FIG. 8B, the central mounting structure 74 includes a clevis 88 and an aperture 56. The previously described shaft 54 and pin 90 of the bracket 50 (as shown in FIG. 4B) are configured to cooperate with the clevis 88 and the aperture 56 on the associated rake/grooming attachment 68. As shown best in FIG. 2B, the clevis 88 surrounds a portion of the shaft 54, and the pin 90 passes through the aperture 56. The pin 90 can also define an aperture 94 suitable for a linchpin 96 (best seen in FIG. 2A and FIG. 7B) to pass through to secure the attachment 68 to the bracket 50, and therefore, the rear attachment structure 36.

Returning to FIGS. 4A and 5A, in some embodiments, the pivoting bracket 64 of the rear attachment structure 36 further includes an angle limiter 98 configured to limit the amount of rotation of the associated rake/grooming attachment 68 about a vertical axis 60. In the shown example, the angle limiter 98 includes three surfaces that are configured to contact the associated rake/grooming attachment 68. A first surface 100 of the three surfaces is substantially horizontal. The first surface 100 is not needed to support the attachment 68, however, if the operator of the vehicle 20 decides to stop dressing or grooming the driven surface, the lift mechanism 66 can be activated to rotate the pivoting bracket 64 to move the first surface 100 into contact with the attachment 68 and then rotate the attachment 68 about axis 44 to disengage the comb structures 78 from the driven surface.

A second surface 102 of the three surfaces is angled at an upward direction from the first surface 100 toward the vehicle 20. A third surface 104 of the three surfaces is connected to the second surface 102 and is configured to limit the rotational freedom of the associated rake/grooming attachment 68 to about 17 degrees measured from the longitudinal axis 58 to its furthest point rotated about the vertical axis 60. In the shown example, the configuration and orientation of the third surface 104 helps encourage not only a limit of rotational freedom about the vertical axis 60, but also helps re-orient the attachment 68 toward a horizontal orientation if the attachment 68 is rotated about the longitudinal axis 58 beyond a certain angle.

In other embodiments, the pivoting bracket 64 of the rear attachment structure 36 does not include an angle limiter 98 (best shown in FIGS. 4B and 5B).

Figure 9:
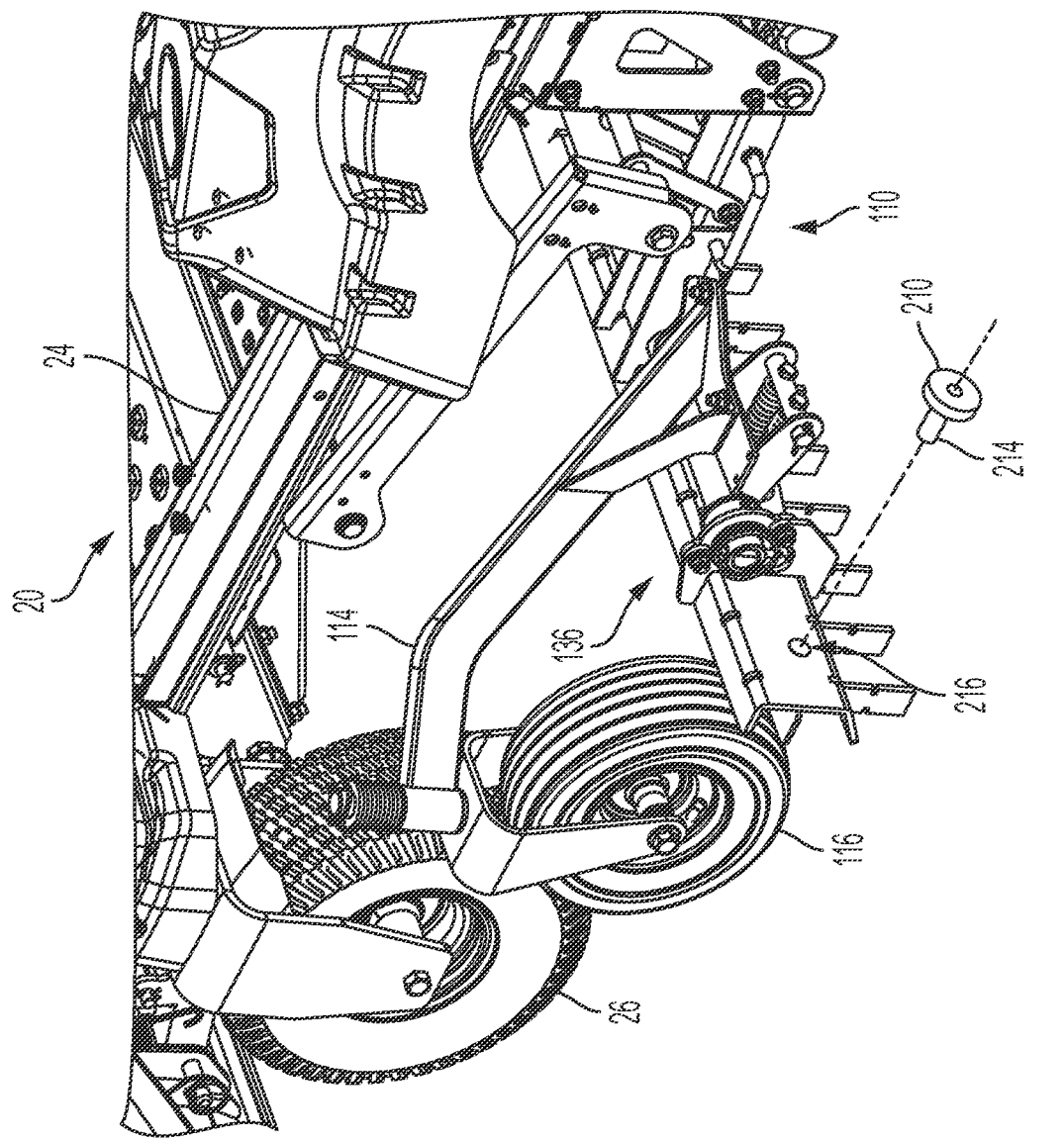
FIG. 9 is a detail view of a mid-mount attachment structure configured to be attached to the rake/groomer of FIG. 1.

Turning to FIG. 9, another example of the sand bunker rake/infield groomer 20 includes a mid-mount attachment structure 110 attached to the frame 24. The mid-mount attachment structure 110 is configured to enable attachment of a scarifier attachment. The mid-mount attachment structure 110 can include one or more supports 114 configured to secure wheels, such as caster wheels 116 configured to help support the scarifier attachment.

Figure 10:
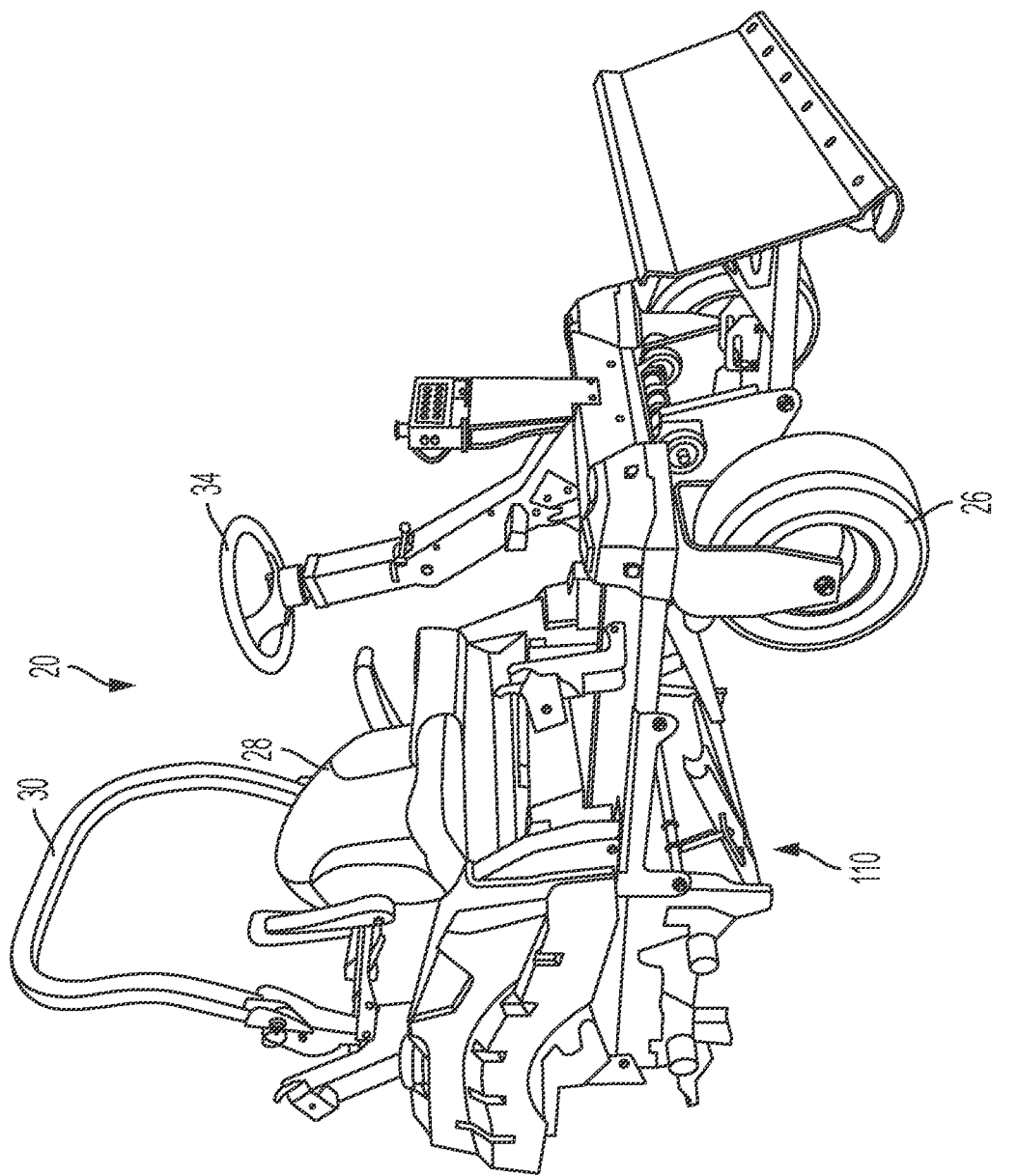
FIG. 10 is a perspective view similar to FIG. 9.
Figure 11:
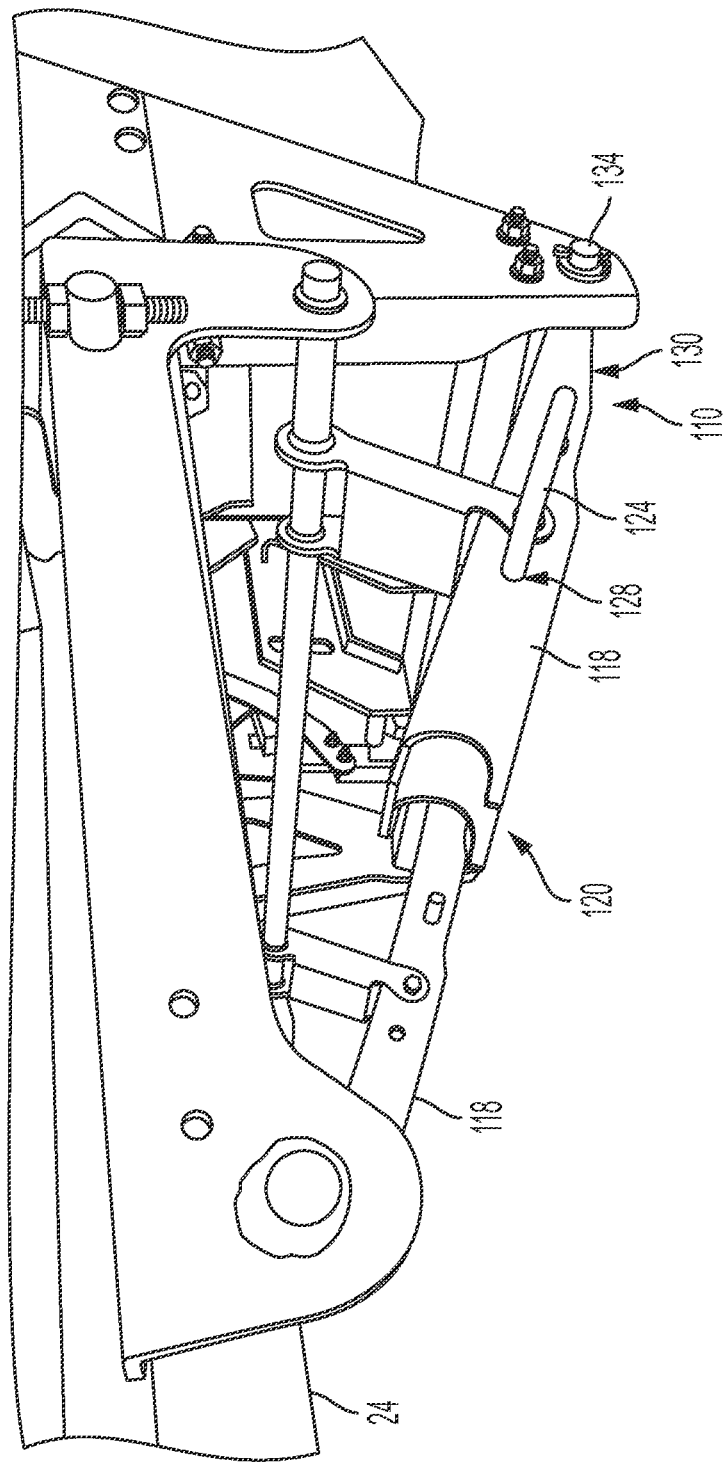
FIG. 11 is a detail view of the mid-mount attachment structure of FIG. 9 showing attachment arms.
Figure 12:
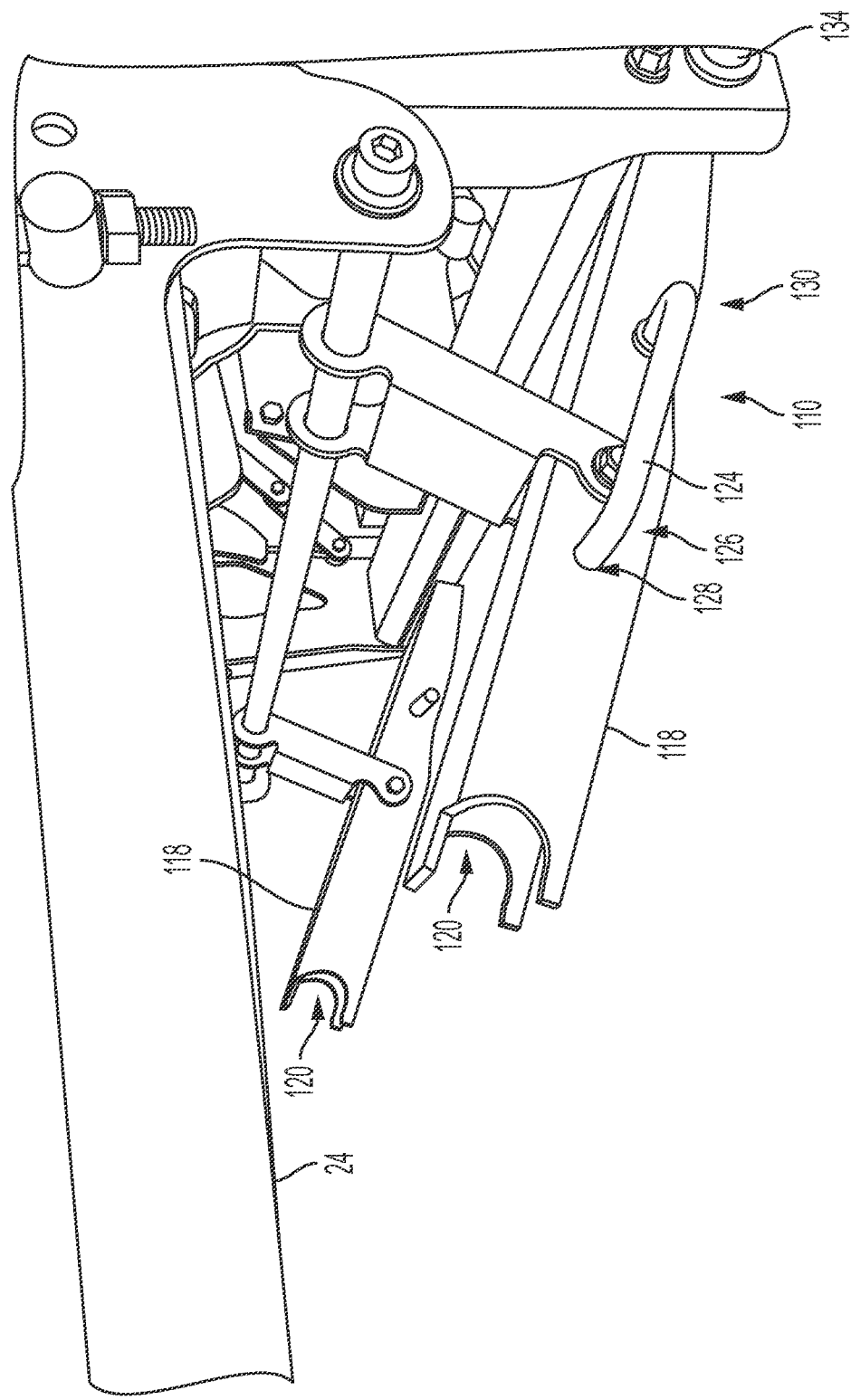
FIG. 12 is similar to FIG. 11.

Turning to FIG. 10, a perspective view of the mid-mount attachment structure 110 is shown. Turning to FIGS. 11 and 12, detail views of the mid-mount attachment structure 110 are shown. The mid-mount attachment structure includes a pair of arms 118, each arm 118 defining a concave opening 120 configured to cooperate with a beam of an associated scarifier attachment. In the shown example, the concave opening 120 is at least partially cylindrical in order to match a cylindrical beam of the associated scarifier attachment that will be described below. However, the concave opening 120 can be of any suitable shape so long as it cooperates with the beam of the scarifier. At least one arm 118 includes a pin 124 configured to help secure the associated scarifier attachment to the pair of arms 118. In the shown example, the pin 124 is generally U-shaped and includes a force member such as a spring (not shown). The front portion 126 of the pin 124 is configured to cooperate with an aperture 128 defined by the arm 118. The force member (e.g., spring) can be located within the arm 118 at the rear portion 130 of the pin 124. The force member acts upon the pin 124 to help ensure its default position is a locking position wherein the front portion 126 passes through the aperture 128 and through a portion of the scarifier attachment. Further use of the pin 124 will be discussed below.

The mid-mount attachment structure 110 can further include a rear axle 134 attached to the frame 24. The arms 118 can be connected to the rear axle 134 such that the pair of arms 118 can be selectively urged to rotate about the rear axle 134. In some embodiments, the rotation can be urged by a device similar to an electric deck lift linkage as commonly used on many riding mowers. In other embodiments, a handle provided near the operator can be rotated up and down to effect rotational motion of the arms 118 about the rear axle 134.

Figure 13:
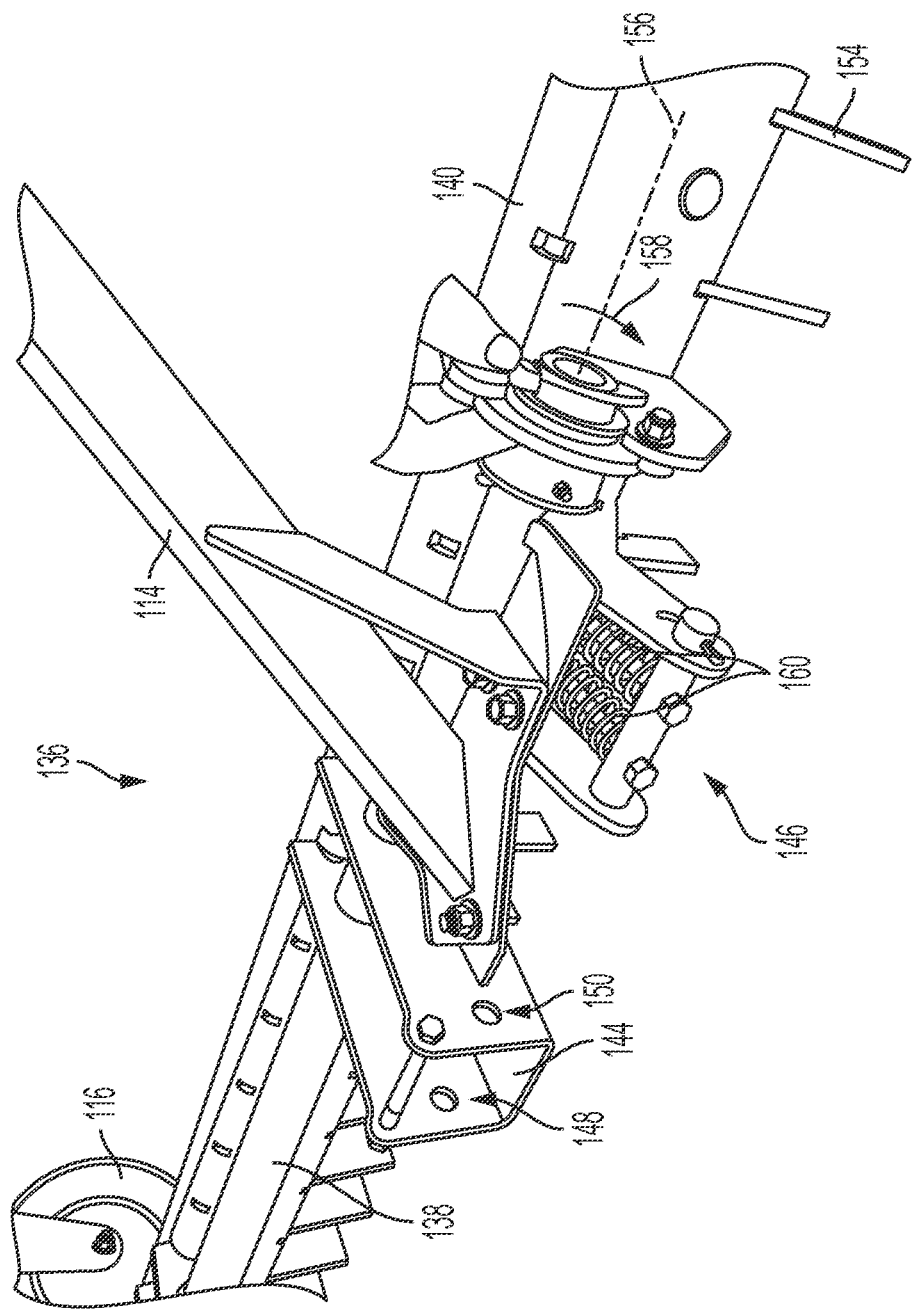
FIG. 13 is a detail view of a scarifier attachment configured to be attached to the mid-mount attachment structure of FIG. 9.
Figure 14:
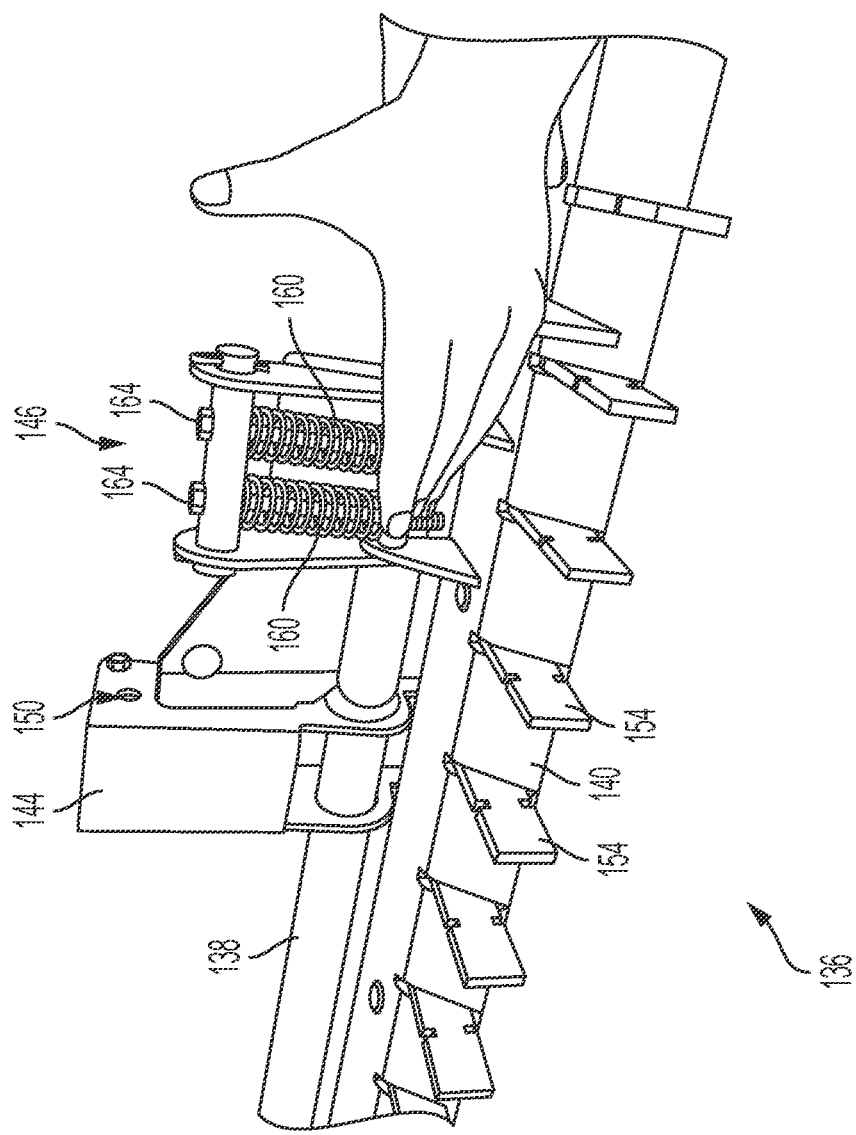
FIG. 14 is similar to FIG. 13 but rotated 90 degrees to show details of a trip mechanism.
Figure 15:
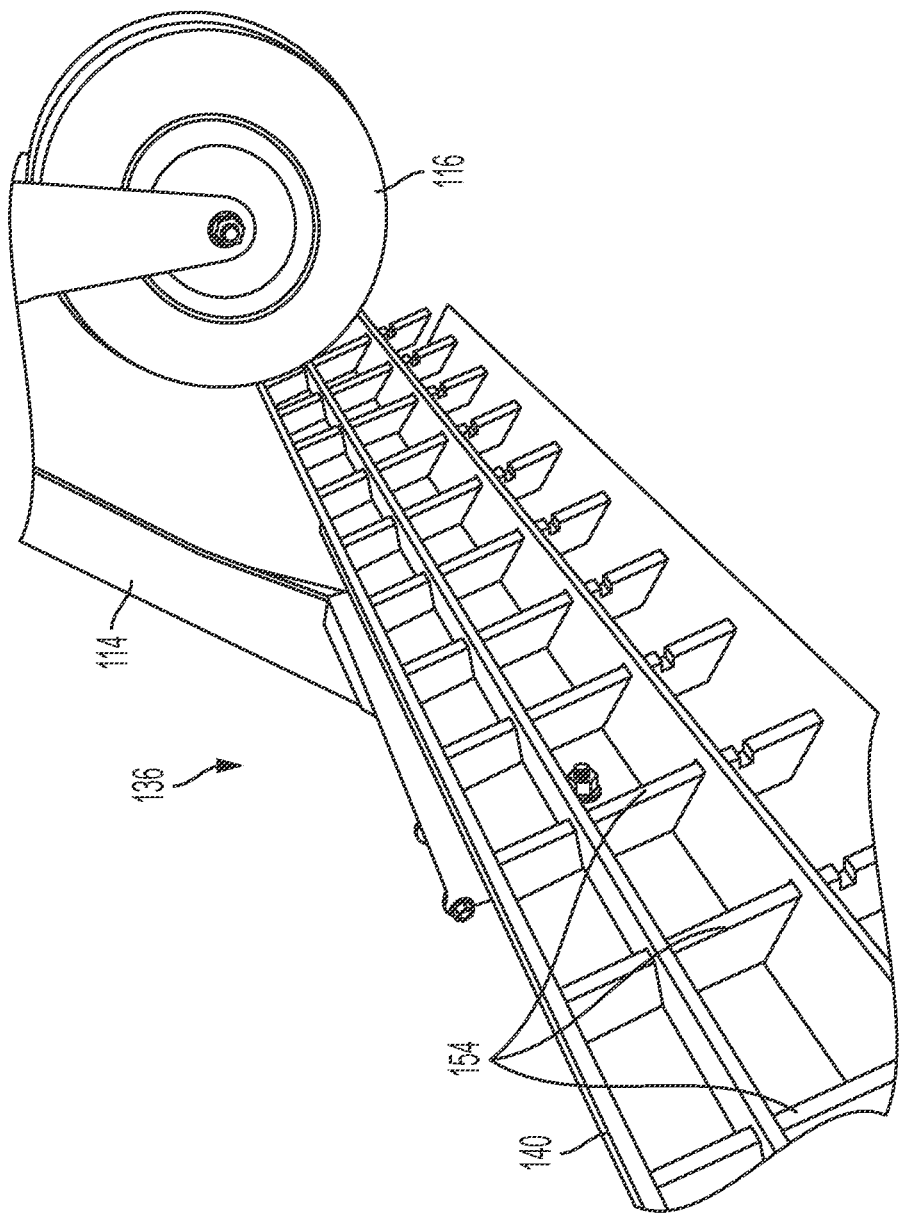
FIG. 15 is a detail view of a front side of a tooth rack of the scarifier attachment of FIG. 13.

Turning to FIGS. 13-15, detail views of an associated scarifier attachment 136 are shown. As shown in FIG. 13, the scarifier attachment 136 can include beam 138, tooth rack 140, attachment bracket 144, and trip mechanism 146. The beam 138 can act as the frame of the scarifier attachment 136 and supports the rest of the scarifier structure.

The attachment bracket 144 defines a space 148 that is configured to surround the arm 118 of the mid-mount attachment structure 110. The concave opening 120 cooperates with the portion of the beam 138 that is within the confines of the attachment bracket 144. The attachment bracket 144 defines an aperture 150 that cooperates with pin 124 as previously discussed. The cooperation between these structures helps ensure a firm connection between the arms 118 and the associated scarifier attachment 136.

The tooth rack 140 is rotatably attached to the beam 138. As shown in FIGS. 13-15, the tooth rack 140 holds teeth 154 that can be engaged with a driven surface. Typical forward motion of the vehicle 20 pushes the teeth 154 along the driven surface resulting in a rotational force about the axis 156 in the direction of arrow 158. This motion is resisted by the trip mechanism 146. However, the trip mechanism 146 is configured to enable a portion of the associated scarifier attachment 136 (i.e., the tooth rack 140) to rotate upon encountering an object or obstacle that creates a sufficient force to activate the trip mechanism 146. In other words, the trip mechanism 146 will keep the tooth rack 140 in the desired default position unless a significant force is developed. At this significant force or greater, the trip mechanism 146 enables the tooth rack 140 to rotate about axis 156 and pass over the obstacle or other impediment. This action helps alleviate significant slowing, jerking, or sudden stopping of the vehicle 20 that may throw the operator from a typical operating position.

The trip mechanism 146 includes at least one force member 160 (e.g., a spring) placed about a threaded member 164. The threaded member can be used to adjust the spring force to be overcome in order to trip the trip mechanism 146. Once the obstacle is cleared, the trip mechanism can reset itself.

Figure 16:
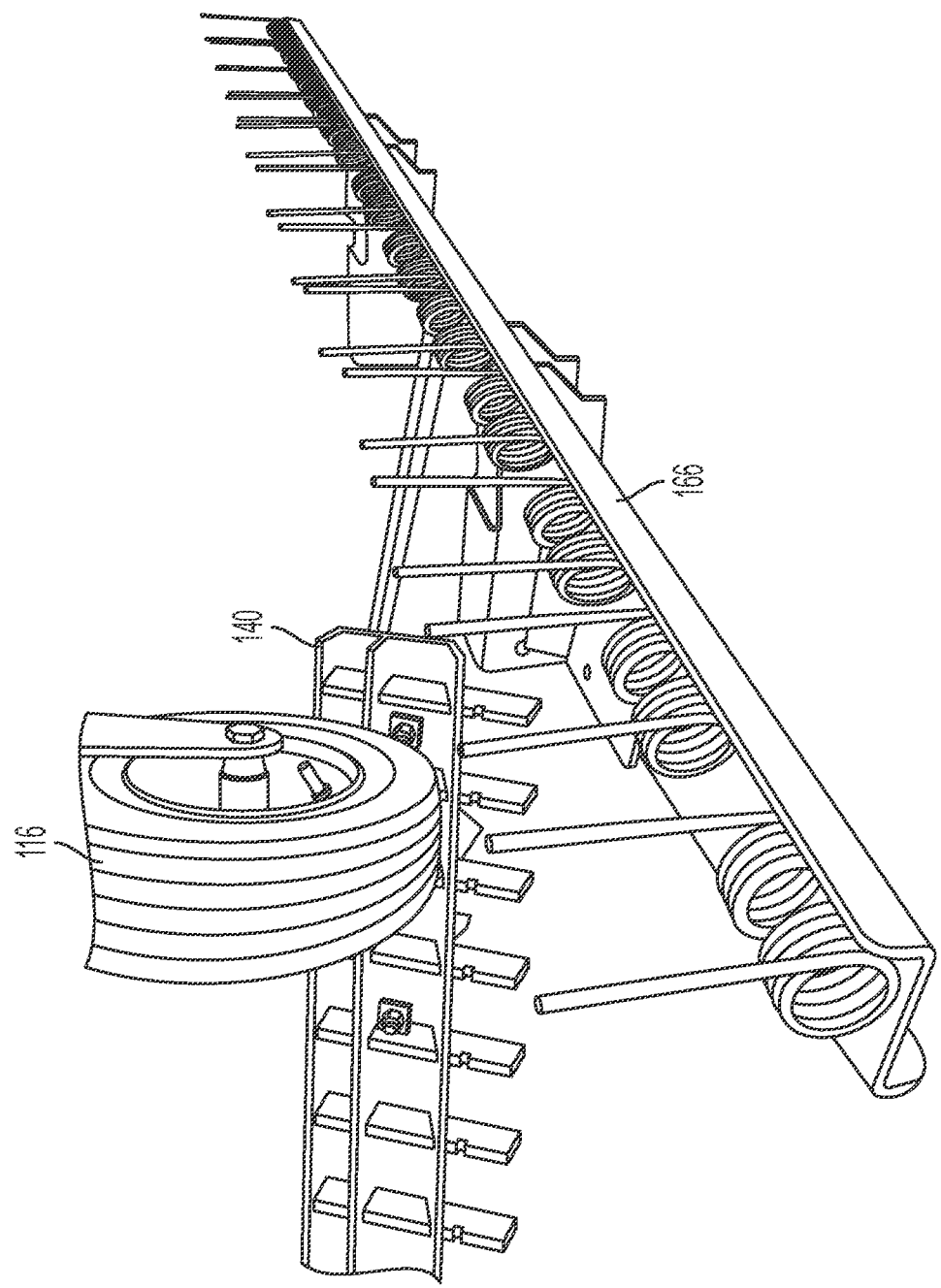
FIG. 16 is a detail view of a torsion spring attachment that can be used with the scarifier attachment of FIG. 13 after removal of the tooth rack.

Turning to FIG. 16, the associated scarifier attachment 136 can use a torsion spring bar 166 rather than the tooth rack 140. The torsion spring bar 166 can be less aggressive on the driven surface than the teeth 154 of the tooth rack 140.

Returning to FIG. 9, the mid-mount attachment structure 110 is often carried by one or more operators to a position underneath a central part of the sand bunker rake/infield groomer 20. This can be a rather strenuous activity, and be eased by the addition of a wheel 210 that can be fastened to the scarifier attachment 136. While only one wheel 210 is shown in FIG. 9, another wheel 210 can be provided on the opposite side of the scarifier attachment. In the shown example, the wheel can provide three- or four-point contact of the wheels 210, 116 with the driven surface. In this way, the scarifier attachment 136 can be pushed on wheels 210, 116 to its desired mounting location. The wheel 210 can be attached to a shaft 214 that is placed within aperture 216 and fastened at a desired elevation by any suitable structure or method.

Figure 17:
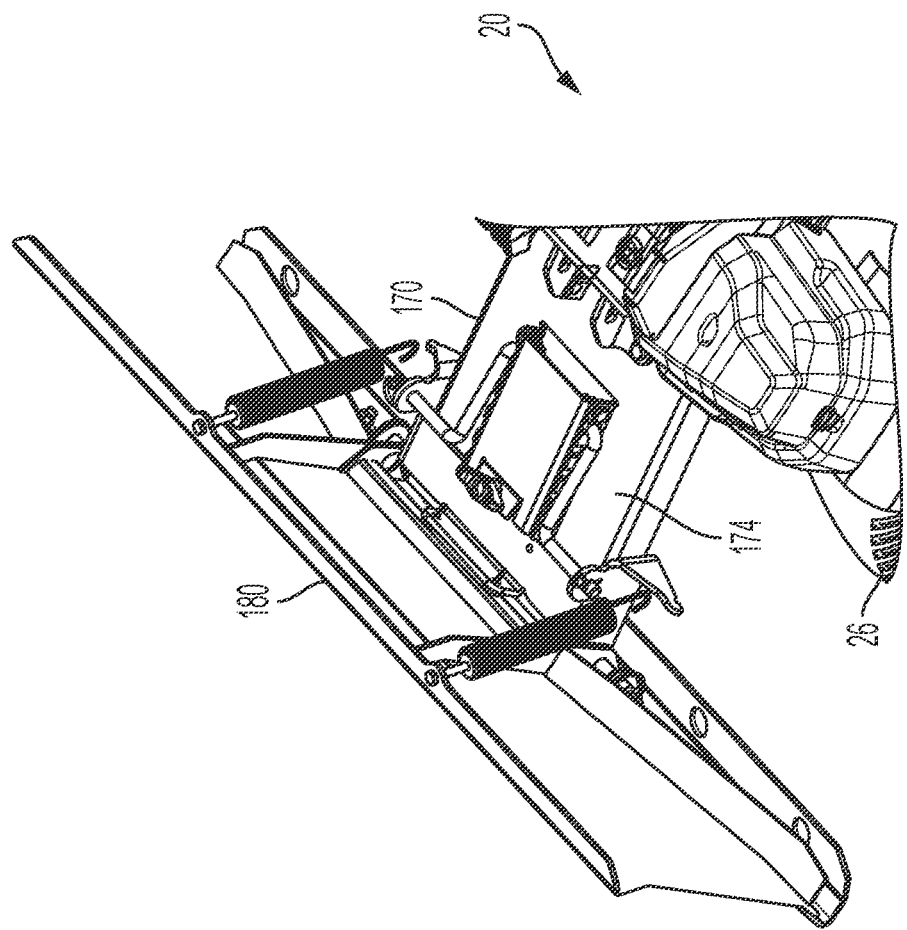
FIG. 17 is a detail view of a front attachment structure configured to be attached to the rake/groomer of FIG. 1.
Figure 18:
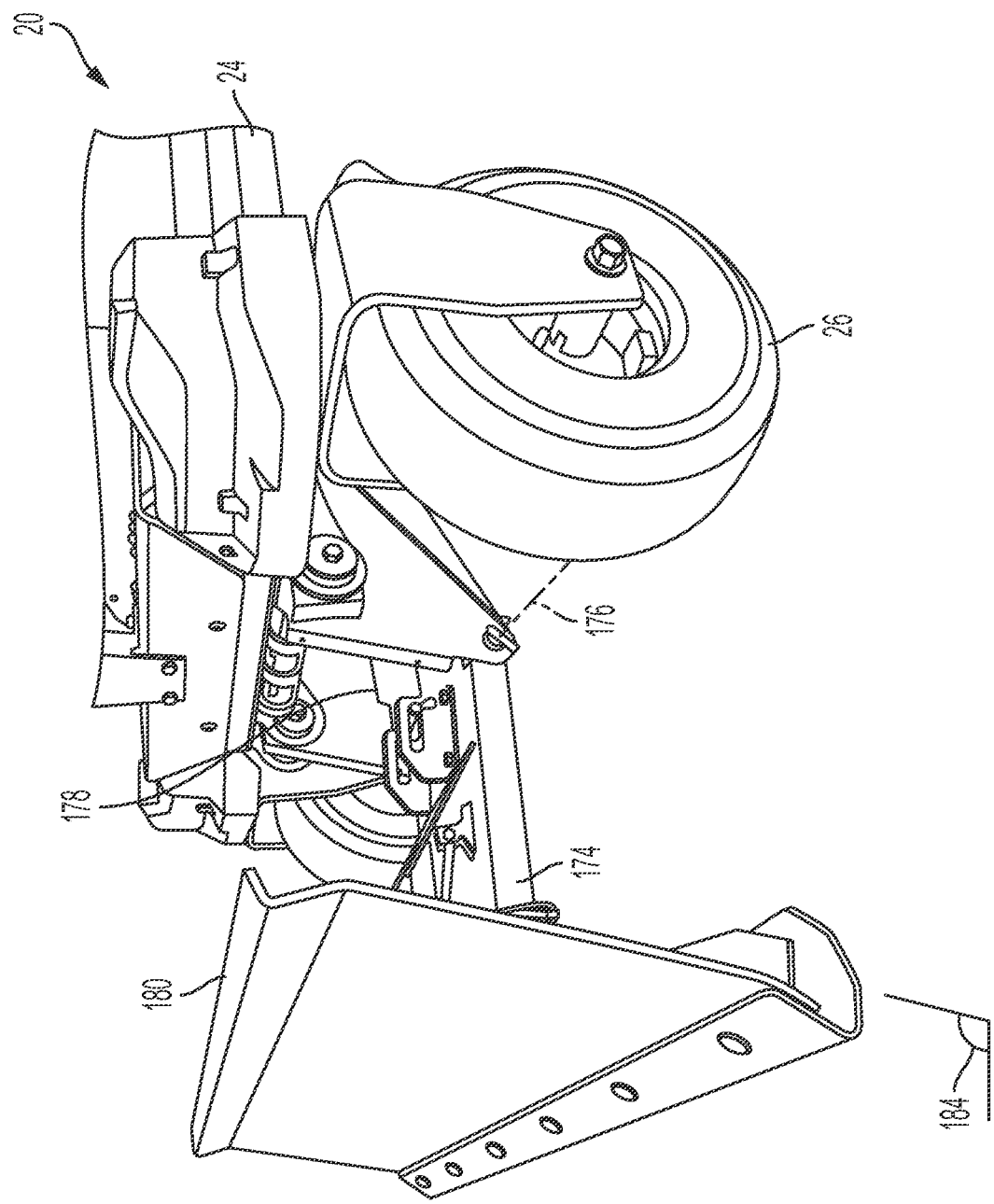
FIG. 18 is similar to FIG. 17 showing a lifting mechanism.

Turning to FIG. 17, a front attachment structure 170 can be attached to the frame 24. Turning to FIG. 18, a detail view if the front attachment structure 170 is shown. The front attachment structure 170 includes a generally flat plate 174 that is connected to the frame 24 via a pinned connection about an axis 176. Similar to the rear attachment structure 36, the front attachment structure 170 can further include a lift mechanism 178. The lift mechanism 178 is configured to control a height of the front attachment structure 170 from the driven surface. In the shown example, the lift mechanism 178 is a cylinder that can be extended and retracted to move the front attachment structure 170 to a desired height from the driven surface. Any suitable mechanism or actuator can be used with the present disclosure.

Figure 19:
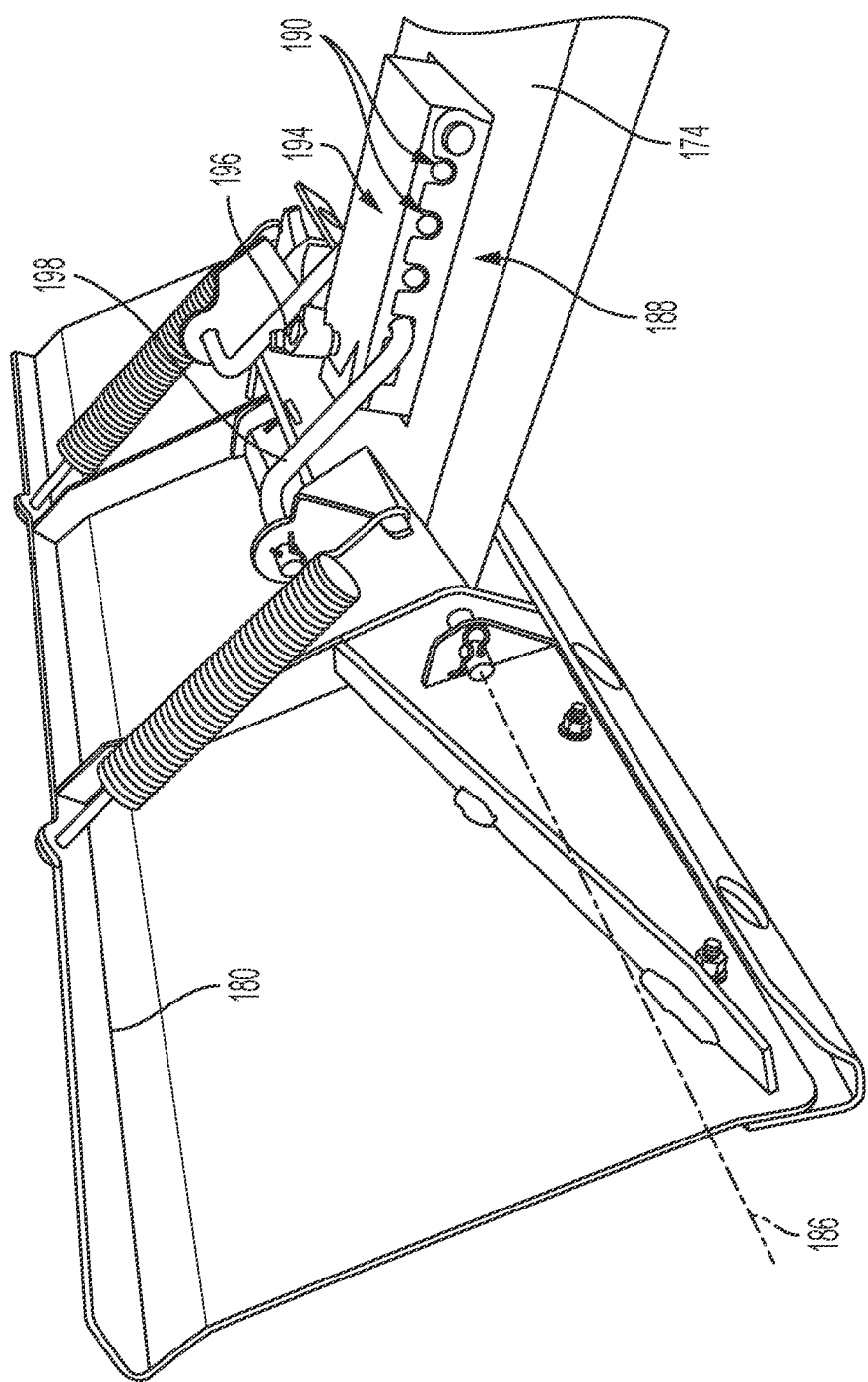
FIG. 19 is similar to FIG. 18 showing a handle and a rack device to adjust the angle of attack of a pusher.

The front attachment structure 170 includes a pusher device 180, (e.g., a plow) that is configured to push material such as sand, dirt, snow from or along the driven surface to a desired location. Additionally, the pusher device 180 is configured to rotate to adjust an angle of attack 184 relative to the driven surface. As shown in FIG. 19, the front attachment structure 170 further includes a pusher axis of rotation 186 that is substantially horizontal. In this example, the pusher device 180 is pinned to the flat plate 174, enabling rotation about the axis 186.

The front attachment structure 170 can include a rack device 188 having several openings 190. A door 194 is located at the top side of the rack device 188 and can be secured by the threaded knob 196. A handle 198 attached to the pusher 180 can be moved to any of the several openings 190 to rotate the pusher 180, thereby adjusting the angle of attack 184. When the door 194 is closed and threaded knob 196 is tightened, the handle 198 is kept in place to maintain the angle of attack 184.

In another example, the sand bunker rake/infield groomer 20 can be a zero-turn radius (ZTR) device. In yet another example, the sand bunker rake/infield groomer 20 includes mechanisms to enable the sand bunker rake/infield groomer 20 to actively engage/disengage the wheels 26 to further optimize its steering capabilities. For example, the sand bunker rake/infield groomer 20 can include no understeer or over-steer due to all-wheel-steering and Ackermann steering geometry, and no spinning or slipping during turns due to accurate motor speed control provided by steering technology in which steering angle and speed are integrated or otherwise synchronized to provide zero-turn performance, as described for example, in patents such as U.S. Pat. Nos. 7,992,659, 7,914,022, 8,474,841, and related patents. This steering technology provides for a zero-turn radius, wherein the entire sand bunker rake/infield groomer 20 (i.e. ZTR device) pivots on a single point along the axle of the rear wheels. In such embodiments, the steering technology on a ZTR machine can provide greater control over steering and machine performance, especially with one or more of the attachments engaged in the driven surface (e.g., the ground).

In one example, many known machines are unable to perform tight trimming work on a clay infield because the machines have a tendency to remain moving forward when one or more attachments are engaged in the ground. The device of the present disclosure can enable an operator to trim right up against the turf without fear of damaging the turf. This is due to the active steering and syncing of the wheel position with the hydrostatic drives that can be provided on the rear wheels 26.

In some embodiments, the sand bunker rake/infield groomer 20 includes zero-turn steering technology configured to control the speed of the steered wheel/tires 26 or tracks (if provided) based on the steer angle of one or more kingpins, and to provide a further speed reduction of the inside wheel/tires 26 or tracks to decrease the machine's turning radius.

In a broad respect, vehicles that are capable of making a low- to zero-radius turn using the independent rotation of drive wheels and by turning the non-driving steerable structure or structures (such as wheels) with a steering input device (in some embodiments, the driving wheels also may be capable of being turned). This may be accomplished using a steering system, a speed control system and an integration device (together, a control system) that are configured to work together to provide correct steering in forward and reverse, and, in some embodiments, to reduce the speed of the outboard drive wheel of the vehicle when it enters an extreme turn under constant speed input. Different systems configured for use in such vehicles are included.

In addition to providing the capability to cause the drive wheels of a given vehicle to rotate at different speeds and/or in different directions, a vehicle control system can also be configured to allow non-driving steerable structures (e.g., wheels) to assist in effecting a turn.

In another example, the drive wheels of the sand bunker rake/infield groomer 20 can be controlled independently of each other. As a result, it is possible with the present systems to rotate one drive wheel (which also may be characterized as a ground engaging wheel) in one direction and another drive wheel in an opposition direction. In some instances, such a difference in directions makes it possible to achieve a low-radius turn, such as a turn known to those of ordinary skill in the art as a zero-radius turn. Further, it is possible with the present systems to rotate different drives in the same direction but at different rates.

While this disclosure has been written in conjunction with the specific embodiments described above, it is evident that many alternatives, combinations, modifications and variations are apparent to those skilled in the art. Accordingly, the described embodiments of this disclosure, as set forth above are intended to be illustrative only, and not in a limiting sense. Various changes can be made without departing from the spirit and scope of this disclosure. Combinations of the above embodiments and other embodiments will be apparent to those of skill in the art upon studying the above description and are intended to be embraced therein. Therefore, the scope of the present disclosure is defined by the appended claims, and all devices, processes, and methods that come within the meaning of the claims, either literally or by equivalence, are intended to be embraced therein. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A sand bunker rake/infield groomer vehicle comprising:
a frame;
a plurality of wheels to traverse a driven surface, wherein the wheels are rotatably mounted to the frame;
a power source mounted to the frame; and
a rear attachment structure attached to the frame, wherein the rear attachment structure comprises:
a bracket including a shaft, wherein the bracket is configured to cooperate with an associated rake/grooming attachment;
a joint enabling rotation of the bracket about three mutually perpendicular axes; and
a pivoting bracket mounted to the frame and configured to rotate about an axis of the joint.

2. The sand bunker rake/infield groomer vehicle according to claim 1, wherein the joint enabling rotation is a ball joint.

3. The sand bunker rake/infield groomer vehicle according to claim 2, wherein the ball joint is configured to enable motion of the associated rake/grooming attachment.

4. The sand bunker rake/infield groomer vehicle according to claim 1, wherein the bracket defines an aperture, wherein the shaft and aperture are configured to cooperate with a clevis and a pin on an associated rake/grooming attachment.

5. The sand bunker rake/infield groomer vehicle according to claim 4, wherein the aperture of the bracket does not typically experience force loading from the pin of the associated rake/grooming attachment.

6. The sand bunker rake/infield groomer vehicle according to claim 1, wherein the bracket comprises a pin, wherein the shaft and the pin are configured to cooperate with a clevis and an aperture on an associated rake/grooming attachment.

7. The sand bunker rake/infield groomer vehicle according to claim 1, further comprising a lift mechanism, wherein the lift mechanism is configured to control a height of the associated rake/grooming attachment from the driven surface.

8. A sand bunker rake/infield groomer vehicle comprising:
a frame;
a plurality of wheels to traverse a driven surface, wherein the wheels are rotatably mounted to the frame;
a power source mounted to the frame;
a zero-turn steering control system; and
a rear attachment structure attached to the frame, wherein the rear attachment structure comprises:
a bracket including a shaft and a pin, wherein the shaft and pin are configured to cooperate with a clevis and an aperture on an associated rake/grooming attachment;
a joint enabling rotation of the bracket about three mutually perpendicular axes; and
a pivoting bracket mounted to the frame and configured to rotate about an axis of the joint.

* * * * *